United States Patent
Perski et al.

(10) Patent No.: US 9,041,659 B2
(45) Date of Patent: May 26, 2015

(54) SYSTEM AND METHOD FOR DIAGNOSTICS OF A GRID BASED DIGITIZER

(75) Inventors: Haim Perski, Hod-HaSharon (IL); Jonathan Moore, Tel-Aviv (IL); Roman Shmulevich, Ashdod (IL); Oran Tamir, Tel-Aviv (IL); Niv Narkiss, Tel-Aviv (IL)

(73) Assignee: N-trig Ltd., Kfar-Saba (IL)

( * ) Notice: Subject to any disclaimer, the term of this patent is extended or adjusted under 35 U.S.C. 154(b) by 1517 days.

(21) Appl. No.: 12/219,531

(22) Filed: Jul. 23, 2008

(65) Prior Publication Data
US 2009/0025987 A1    Jan. 29, 2009

Related U.S. Application Data

(60) Provisional application No. 60/935,115, filed on Jul. 26, 2007, provisional application No. 61/006,272, filed on Jan. 4, 2008.

(51) Int. Cl.
| | |
|---|---|
| *G06F 3/041* | (2006.01) |
| *G09G 3/20* | (2006.01) |
| *G06F 3/044* | (2006.01) |

(52) U.S. Cl.
CPC ...... *G06F 3/041* (2013.01); *G06F 2203/04111* (2013.01); *G06F 3/0418* (2013.01); *G06F 3/044* (2013.01)

(58) Field of Classification Search
CPC ........... G06F 3/01; G06F 3/041; G06F 3/044; G06F 3/047; G06F 3/0418; G08C 21/00
USPC ................... 178/18.06, 18.07; 702/110, 116; 345/178
See application file for complete search history.

(56) References Cited

U.S. PATENT DOCUMENTS

| | | | |
|---|---|---|---|
| 5,420,500 A * | 5/1995 | Kerschner ..................... 324/72.5 |
| 5,956,020 A | 9/1999 | D'Amico et al. |
| 6,690,156 B1 | 2/2004 | Weiner et al. |
| 7,292,229 B2 | 11/2007 | Morag et al. |
| 7,372,455 B2 | 5/2008 | Perski et al. |
| 8,253,425 B2 | 8/2012 | Reynolds et al. |
| 2002/0091493 A1* | 7/2002 | Christopher et al. ......... 702/113 |
| 2003/0125887 A1* | 7/2003 | Ogawa et al. ................... 702/66 |
| 2003/0234770 A1* | 12/2003 | MacKey ....................... 345/173 |
| 2004/0183787 A1 | 9/2004 | Geaghan et al. |

(Continued)

FOREIGN PATENT DOCUMENTS

| | | |
|---|---|---|
| JP | 2002-342033 | 11/2002 |
| WO | WO 2009/013746 | 1/2009 |

OTHER PUBLICATIONS

International Preliminary Report on Patentability Dated Feb. 4, 2010 From the International Bureau of WIPO Re.: Application No. PCT/IL2008/001019.
International Search Report Dated Dec. 3, 2008 From the International Searching Authority Re.: Application No. PCT/IL2008/001019.
Written Opinion Dated Dec. 3, 2008 From the Interntional Searching Authority Re.: Application No. PCT/IL2008/001019.

(Continued)

*Primary Examiner* — Mark Regn

(57) ABSTRACT

A method for testing a digitizer to determine an operative property of the digitizer, wherein the digitizer includes a sensor grid, comprises providing an input signal on a first portion of the sensor grid, detecting at least one output signal in a second portion of the sensor grid responsive to the input signal in the first portion, and determining at least one operative property of the sensor based on the at least one output signal, wherein at least the transmitting, detecting and determining is performed autonomously by the digitizer.

34 Claims, 17 Drawing Sheets

(56) References Cited

U.S. PATENT DOCUMENTS

2006/0092142 A1* 5/2006 Gillespie et al. ............. 345/173
2006/0092148 A1   5/2006 Ozawa et al.
2007/0200831 A1* 8/2007 Wang ............................ 345/173
2007/0268272 A1  11/2007 Perski et al.
2008/0158183 A1* 7/2008 Hotelling et al. ............. 345/173

OTHER PUBLICATIONS

Rekimoto "SmartSkin: An Infrastructure for Freehand Manipulation on Interactive Surfaces", CHI 2002, Minneapolis, Minnesota, USA, Apr. 20-25, 2002, 4(1): 113-120, 2002.
Translation of Official Letter and Search Report Dated Aug. 26, 2013 From the Intellectual Property Office, Ministry of Economic Affairs of Taiwan Re. Application No. 97127923.

* cited by examiner

SYSTEM AND METHOD FOR DIAGNOSTICS OF A GRID BASED DIGITIZER

RELATED APPLICATIONS

The present application claims the benefit under section 35 U.S.C. §119(e) of U.S. Provisional Application No. 60/935,115 filed on Jul. 26, 2007 and of U.S. Provisional Application No. 61/006,272 filed on Jan. 4, 2008 both of which are incorporated herein by reference in their entirety.

FIELD OF THE INVENTION

The present invention relates to a touch sensitive digitizer, and more particularly to diagnostics of a touch sensitive digitizer.

BACKGROUND OF THE INVENTION

Touch technologies are commonly used as input devices for a variety of products. The usage of touch devices of various kinds is growing sharply due to the emergence of new mobile devices such as Personal Digital Assistants (PDA), tablet PCs and wireless Flat Panel Display (FPD) screen displays. These new devices are usually not connected to standard keyboards, mice or like input devices, which are deemed to limit their mobility. Instead there is a tendency to use touch sensitive digitizers of one kind or another. A stylus and/or fingertip may be used as a user interaction.

Touch detection accuracy may change and/or touch sensitive digitizers may malfunction over time due to a number of system and environmental reasons, such as due to handling and dropping of the device. Monitoring and testing of digitizers typically involves manual evaluation of the device by an on-site technician and typically requires dedicated equipment. Such evaluation is typically both costly and time inefficient.

U.S. Pat. No. 6,690,156 entitled "Physical Object Location Apparatus and Method and a Platform using the same" and U.S. Pat. No. 7,292,229 entitled "Transparent Digitizer" both of which are assigned to N-trig Ltd., the contents of both which are incorporated herein by reference, describe an electro-magnetic method for locating physical objects on a FPD and a transparent digitizer that can be incorporated into an electronic device, typically over the active display screen. The digitizer sensor includes a matrix of vertical and horizontal conducting lines to sense an electric signal. Positioning the physical object at a specific location on the digitizer provokes a signal whose position of origin may be detected.

U.S. Pat. No. 7,372,455 entitled "Touch Detection for a Digitizer" assigned to N-trig Ltd, which is incorporated herein by reference in its entirety, describes a digitizing tablet system capable of detecting position of both physical objects and fingertip touch using the same sensing conductive lines. Typically, the system includes a transparent sensor overlaid on a FPD. The digitizer's sensor includes a matrix of vertical and horizontal conducting lines to sense an electric signal. Touching the digitizer in a specific location provokes a signal whose position of origin may be detected.

U.S. Patent Application Publication No. 20070268272 entitled "Variable Capacitor Array" assigned to N-trig Ltd, which is hereby incorporated by reference in its entirety, describes a digitizer sensor including pairs of conductive lines coupled to differential amplifiers through which a difference signal is detected, and capacitors operative to balance differences in parasitic capacitance between the conductive lines.

U.S. Patent Application Publication No. 20040183787 entitled "Remote Touch Simulation Systems and Methods" which is hereby incorporated by reference in its entirety describes systems and methods for remotely simulating human touch on a touch screen sensor and for remotely performing diagnostics, calibration, and repair procedures based on the simulated human touch. Cooperation between a subject touch screen system and a remote system via a communication or network link is implemented to simulate human touch and perform diagnostics, calibration, and repair procedures.

SUMMARY OF THE INVENTION

An aspect of some embodiments of the invention is the provision of cost efficient systems and methods for monitoring and testing touch sensitive digitizers while assembled. According to some embodiments of the present invention, there is provided a method where monitoring and testing of the touch devices is performed autonomously, e.g. self-operated by the digitizer and does not require dedicated hardware, external testing tools and/or user intervention.

An aspect of some embodiments of the present invention is the provision of a method for testing a digitizer to determine an operative property of the digitizer, wherein the digitizer includes a sensor grid, the method comprising: providing an input signal on a first portion of the sensor grid; detecting at least one output signal in a second portion of the sensor grid responsive to the input signal in the first portion; and determining at least one operative property of the sensor based on the at least one output signal, wherein at least the transmitting, detecting and determining is performed autonomously by the digitizer.

Optionally, the method for testing a digitizer to determine an operative property of the digitizer is performed in the absence of user interaction with the digitizer.

Optionally, the method is performed by firmware of the digitizer.

Optionally, the sensor grid includes a first set of parallel conductive gridlines and a second set of parallel conductive gridlines, wherein the second set is positioned orthogonally from the first set to form the sensor grid.

Optionally, the input signal is provided over one or more parallel gridlines.

Optionally, the at least one output signal is detected from at least one gridline orthogonal to the one or more parallel gridlines on which the input signal is provided.

Optionally, the at least one output signal is detected from at least one gridline parallel to the one or more parallel gridlines through on the input signal is provided.

Optionally, the output signal is effected by capacitive coupling between the first portion and the second portion of the sensor grid.

Optionally, the output signal is effected by capacitive coupling at grid junctions formed between the first and second set of parallel gridlines.

Optionally, pairs of parallel gridlines are input to a differential amplifiers and wherein output from the differential amplifiers is sampled to produce the outputs from the sensor.

Optionally, the method comprises grounding a first input of at least one differential amplifier to detect a signal propagating on a second input of the at least one differential amplifier.

Optionally, the method comprises providing an input signal on all gridlines along a first axis of the grid; and detecting output from at least one gridlines along a second axis of the grid.

Optionally, the input signal is an AC signal.

Optionally, the input signal is provided at a frequency used during user interaction with the digitizer for finger detection.

Optionally, detecting includes comparing the amplitude of the output from the sensor grid to a pre-defined threshold.

Optionally, detecting includes comparing the energy of the output from the sensor grid in a pre-defined frequency band to a pre-defined threshold.

Optionally, detecting includes comparing the output of the sensor grid to properties of the input signal.

Optionally, the method comprises detecting a plurality of output signals of the second portion and comparing the amplitude of each output from the plurality to an average output of the plurality.

Optionally, the method comprises comparing the amplitude of each output of the plurality to an average output and a standard deviation of the average.

Optionally, the method comprises determining connectivity between gridlines of the sensor grid and circuitry of the digitizer.

Optionally, the method comprises providing an AC input signal on at least one first gridline of the sensor grid; sampling an output signal from at least one second gridline crossing the at least one first gridline utilizing output circuitry of the at least one second gridline; comparing the output signal to a threshold; and determining that the at least one second gridline is connected to output circuitry of the digitizer responsive to the output signal being above the threshold.

Optionally, the method comprises detecting electrical breaks in gridlines of the sensor grid.

Optionally, the method comprises providing an AC input signal on a first end of a first gridline of the sensor grid, the first gridline including a first end and a second end; sampling an output signal from at least one second gridline crossing the at least one first gridline closest to the second end; comparing the output signal to a threshold; and determining that the first gridline includes a break responsive to the output signal being below the threshold.

Optionally, the method comprises determining cross-talk between gridlines of the sensor grid.

Optionally, the method comprises providing an AC input signal on a gridline of the sensor grid; sampling output signals from at least neighboring gridlines parallel the first gridline; comparing the output signals to a threshold; and determining that there is cross talk between the gridline on which an input signal is provided and the neighboring gridlines responsive to at least one output signal from the output signals sampled being above the threshold.

Optionally, the method comprises determining shorts between gridlines of the sensor grid.

Optionally, the method comprises providing an AC input signal on a gridline of the sensor grid; sampling output signals from neighboring gridlines parallel to the first gridline; comparing the output signals to a threshold; and determining that there is a short between the gridline through which an input signal is transmitted and a neighboring gridline responsive to an output signal from the neighboring gridline being above the threshold.

Optionally, the method comprises determining an imbalance between gridlines of the sensor grid.

Optionally, the method comprises providing an AC input signal on at least one first gridline of the sensor grid; sampling an output signal from at least one differential amplifier having input from two parallel gridline crossing the at least one first gridline; comparing the output signal to a threshold; and determining that there is an imbalance between the two gridlines serving as input to the differential amplifier responsive to the output signal being above the threshold.

Optionally, the method comprises reporting the determined at least one operative property to a host computer associated with the digitizer.

Optionally, the method comprises reporting the determined at least one operative property to a user interacting with the host computer.

Optionally, the method comprises determining if the sensor grid is operable and reporting operability of the sensor grid.

Optionally, the method comprises compensating for at least on malfunctioning property of the digitizer.

An aspect of some embodiments of the present invention is the provision of a method for determining an operative property of a sensor grid, the method comprising: providing an AC signal on at least one first gridline of the sensor grid, the at least one first gridline associated with a first axis of the grid; sampling output from at least one second gridline of the sensor grid, the at least one second gridline associated with a second axis of the grid, wherein the first axis and second axis cross to form the grid; analyzing the output to determine signals responsive to capacitive coupling between the at least one first gridline and the at least one second gridline; and determining an operative property of the sensor grid based on the detected signals.

Optionally, the sampling is performed in the absence of user interaction with the digitizer.

Optionally, the method is performed autonomously by the digitizer.

Optionally, the method comprises determining an operative property of the at least one first gridline based on the sampled output from the at least one second gridline.

Optionally, the method comprises determining an operative property of the at least one second gridline responsive to input to the at least one first gridline.

Optionally, at least one pair of parallel conductive gridlines is input to a differential amplifier and wherein output from the differential amplifier is sampled to obtain the output from the gridlines.

Optionally, the method comprises grounding one of the inputs of the at least one differential amplifier to detect a signal propagating on the other input of the at least one differential amplifier.

Optionally, the input signal is transmitted at a frequency used during user interaction with the digitizer for finger detection.

Optionally, the first axis and the second axis are orthogonal to each other.

Optionally, the method comprises determining connectivity between gridlines of the sensor grid and circuitry of the digitizer.

Optionally, the method comprises determining that the at least one second gridline is connected responsive detecting in the output, a signal responsive to capacitive coupling between the at least one first gridline and the at least one second gridline.

Optionally, the method comprises detecting electrical breaks in gridlines of the grid.

Optionally, the method comprises propagating an AC signal through a first end of an input gridline of the sensor grid associated with a first axis of the grid, the gridline including a first end and a second end; and determining that the input gridline does not include a break responsive to the detecting from the output, a signal responsive to capacitive coupling from a gridline closest to the second end.

Optionally, the method comprises reporting the determined at least one operative property to a host computer associated with the digitizer.

Optionally, the method comprises reporting the determined at least one operative property to a user interacting with the host computer.

Optionally, the method comprises determining if the sensor grid is operable and reporting operability of the sensor grid.

Optionally, the method comprises compensating for at least on malfunctioning property of the digitizer.

An aspect of some embodiments of the present invention is the provision of a method for testing a digitizer including an excitation coil configured for triggering circuitry of an object used for user interaction with the digitizer to self-determine an operative property of the excitation coil, wherein the digitizer includes a sensor grid, the method comprising: providing an AC signal in the excitation coil, the excitation coil at least partially surrounding the sensor grid, the excitation coil configured for transmitting an excitation signal at, at least one excitation frequency; sampling output from at least one gridline of the sensor grid; and determining that the excitation coil is connected at least on one end to connecting circuitry responsive to the output from the at least one gridline exceeding a first threshold.

Optionally, the method comprises determining that the excitation coil is connected on both ends to connecting circuitry responsive to the output from the at least one gridline exceeding a second threshold and displaying a peak at the at least one excitation frequency of the excitation coil.

An aspect of some embodiments of the present invention is the provision of a method for a diagnosis of a grid based digitizer sensor, the method comprising: transmitting an AC signal to a probe; invoking a coupled signal on at least one gridline in response to capacitive coupling between and the gridline while the probe is positioned over the at least one gridline in a first area of the grid; detecting an output signal from a second area of the grid; and determining an operative property of the sensor based on the output signal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
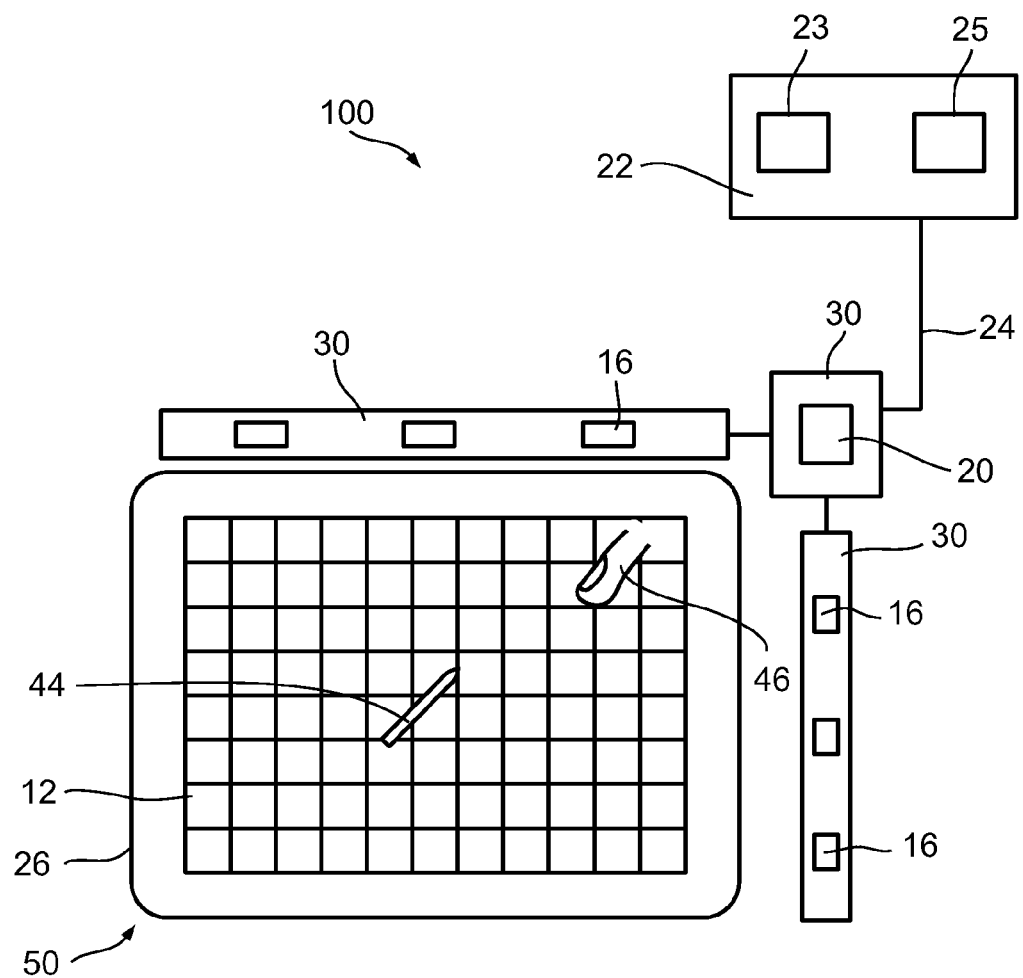
FIG. 1 illustrates an exemplary simplified block diagram of a digitizer system in accordance with some embodiments of the present invention.

The present invention relates to a digitizer, and more particularly to diagnostics of a digitizer. A defect in one of the sensor's conductors and/or coil connectivity may result in false detected position of an object and therefore reduces the system's accuracy. A need arises for a self-diagnostic method adapted to diagnose problems in the digitizer system, for example by measuring whether there are defects in the sensor's conductors.

An aspect of some embodiments of the present invention is the provision of methods for a grid based digitizer to autonomously perform diagnostics, monitoring and/or determining of its operative properties without requiring user intervention, e.g. interaction with the digitizer or engagement with an external diagnostic device. According to some embodiments of the present invention, self-monitoring and/or self-determination of the operative properties of the digitizer is initiated in response to user command, at pre-defined intervals, and/or in response to pre-defined event. For example, self-monitoring of operative properties may be performed when the system is turned on. In some exemplary embodiments, the diagnostic procedure is controlled by firmware and/or software.

According to some embodiments of the present invention, the digitizer performs self-diagnostics, self-monitoring and/or self-determination of operative properties of a sensing grid of the digitizer. In some exemplary embodiments, the intact electrical connection between the gridlines and electrical components of the device is tested. In some exemplary embodiments, short circuits on the gridlines are determined. In some exemplary embodiments, cross-talk between the gridlines is tested. Typically in grid based sensors only one end of each of the gridlines includes I/O terminals and is connected to electronic components through which input into as well as output from a gridline is achieved. Due to this configuration the typical method of determining obstructions through conductive lines, by testing signal propagation along the length of the line, cannot be easily implemented without adding extra components to the device, e.g. additional I/O terminals and electronic components on the opposite end of the line. Adding extra components is typically not desirable as it increases costs as well as requires additional contact points on the sensor leading to undesired noise introduced into the system. Furthermore, such components may act as an undesirable load on the line.

Typically input to the digitizer is provided by a user interaction positioned on or over the sensor grid. User interaction is defined herein as an object used to provide input to the digitizer by positioning and/or moving the object over and/or on the sensor grid. Examples of user interaction include a stylus and fingertip. For example, an activated stylus imposes an input signal on one or more gridlines of the digitizer. Touch by a finger alters a triggering signal on one or more lines of the digitizer sensor that is detected on a cross line. The input signal produced by the user interaction, e.g. stylus and/or finger touch is detected based on sampled output from the sensor grid. According to some embodiments of the present invention, operative properties of a sensor grid are determined in the absence of input by a user interaction. In some exemplary embodiments, operative properties of a sensor grid are determined by using the triggering signal and/or signals similar to the triggering signal as input to the digitizer and detecting output on alternate lines responsive to the input.

According to some embodiments of the present invention, operative properties of a sensing grid is determined by transmitting input signals in a first portion of the sensor grid and analyzing resultant output signals generated on a second portion of the sensor grid in response to the input signals. In some exemplary embodiments, the first portion corresponds to and/or is defined by one or more gridlines and the second portion corresponds to and/or is defined by one or more other gridlines.

The present inventors have found that capacitive coupling effect that occurs between the gridlines at grid junctions can be implemented to indirectly sense signal propagation along the length of conductive gridlines. According to some embodiments of the present invention, operative properties of a sensing grid is determined by transmitting input signals on one or more gridlines and analyzing resultant output signals generated on crossing gridlines due to capacitive coupling at grid junctions of the input signals. Typically, the input signal employed for diagnostics includes an Alternating Current (AC) signal. In some exemplary embodiments, inputs signals are transmitted through the gridlines at a pre-determined sequence. Input signals may be transmitted through one gridline at a time or through a plurality of gridlines substantially simultaneously. Some or all the crossing gridlines may be sampled to determine status of each gridline. In some exemplary embodiments, amplitude frequency and/or phase of the output signal on the cross gridlines is detected and/or analyzed. In some exemplary embodiments, the entire grid is diagnosed. In other exemplary embodiments, specified gridlines and/or grid areas are diagnosed. Based on amplitude, phase and/or frequency detected in the output signal, electrical connectivity of each of the gridlines, shorting and/or cross talk between the gridlines is determined.

According to some embodiments, the digitizer performs self-determination of operative properties of an excitation coil surrounding the sensing grid. Typically, the excitation coil is used to trigger circuitry in a stylus or other object used for user interaction to produce a response that can subsequently be detected by the sensing grid. According to some embodiments of the present invention, the digitizer detects proper electrical connection of the excitation coil to the device. According to some embodiments of the present invention, operative properties of the excitation coil is determined by transmitting an input signal to the excitation coil and detecting and/or analyzing output signals generated on one or more gridlines of the digitizers. Typically, the excitation coil includes a coil connected to a capacitor to form a resonance circuit. In response to an input signal, e.g. excitation signal, the excitation coil resonates at the excitation frequency to produces an electromagnetic field. The output signals detected are responsive to coupling between the surrounding excitation coil and the gridlines. According to some embodiments of the present invention, amplitude and frequency characteristics of the output signals from the grid are determined and/or analyzed.

The present inventors have found that the output signal detected on the gridlines while the electrical connections of excitation coil are intact at both ends will correspond to the input signal to the excitation coil. For example, the output signal detected on the grid will include a peak at the excitation frequency of the excitation coil. The inventors have found that when the excitation coil is connected only at a single end, the coil can be treated as an antenna which transmits electric field. In such a case the output signal detected on the grid will not include a peak at the excitation frequency of the excitation coil and/or the peak at the excitation frequency will be less pronounced.

According to some embodiments of the present invention, indication of a detected malfunction is communicated to the host computer. For example, the host computer associated with the digitizer may relay a message to the user via the graphic display indicating a malfunction. In some exemplary embodiments, in response to a detected electrical obstruction in one or more gridlines, the obstructed gridlines is neutralized, e.g. not sampled during operation of the digitizer. In some exemplary embodiments, data analysis compensates for neutralization of a specific gridline based on output from neighboring gridlines. In some exemplary embodiments, in response to a minor electrical obstruction in a specific area of the grid, output from that area is ignored during operation of the digitizer. For example, the host computer may relay a message to the user that a specific area of the digitizer has been neutralized due to malfunction.

An aspect of some embodiments of the present invention is the provision of systems and methods for manually determining operational properties of a grid based digitizer including only I/O terminal on each gridline, e.g. conductive gridline. According to some embodiments of the present invention, during operational testing of a grid based digitizer, an input signal is transmitted via a conductive pad of gridline while output signals are detected on one or more I/O terminals connected to crossing gridlines of the digitizer sensor.

An aspect of some embodiments of the present invention is the provision of systems and methods for determining operational properties of a grid based digitizer. In some exemplary embodiments, the grid based digitizer is pre-assembled, e.g. pre-assembled within a frame or partially assembled. In some exemplary embodiments, the grid based digitizer is pre-assembled over a display screen. According to some embodiments of the present invention, there is provided a system and method for generating signals through gridlines of the digitizer via capacitive coupling without requiring direct electrical contact with the gridlines. According to some embodiments of the present invention, there is provided a system and method for detecting signals propagating through gridlines of the digitizer via capacitive coupling without requiring direct electrical contact with the gridlines.

According to some embodiments of the present invention, the system includes at least two conductive probes to be positioned over the digitizing surface. Optionally, the tip of the conductive probe is gold. Optionally, the length of the probe is approximately 30 mm. In some exemplary embodiments, one of the probes functions to transmits an AC signal, e.g. a pulsed AC signal, that can be picked up one or more gridlines via capacitive coupling while the other probe functions to pick-up a signal propagating on one of gridlines via capacitive coupling.

In operation, the probes are positioned over the digitizing surface at a distance from each other along the length of a gridline. In some exemplary embodiments, the probe function to pick-up a signal propagating on one of gridlines is replaced by a conductive pad positioned over one of the I/O terminals of the digitizer sensor to improve pick-up capability. In some exemplary embodiments, the conductive pad of the tester is in electrical contact with the I/O terminals of the digitizer sensor. In some exemplary embodiments, a robotic arm controls positioning of the probes so that different areas of the grid and different gridlines can be tested.

In some exemplary embodiments, a plurality of probes is pre-arranged on a surface that can be positioned over the digitizer sensing surface. Typically, the probes are arranged such that the distance between the probes corresponds to the distance between the gridlines of the digitizer with corresponding I/O terminals facing each of the probes at a distance corresponding to the size of the grid. Alignment may be achieved manually or with one or more alignments element, e.g. alignment elements fit around the digitizer frame.

During operation, an input signal is transmitted by one or more probes. Typically, the input signal is an AC signal at a pre-defined amplitude and frequency. Typically, capacitive coupling between the probes and the gridlines generate a signal that propagates through the gridlines. Similarly, capacitive coupling between the gridlines and the test conductive pads will prompt signal pick up on the test conductive pads. According to some embodiments of the present invention, signals picked up on the test conductive pads are detected and analyzed to determined operational properties of the sensor grid as described above.

Figure 2:
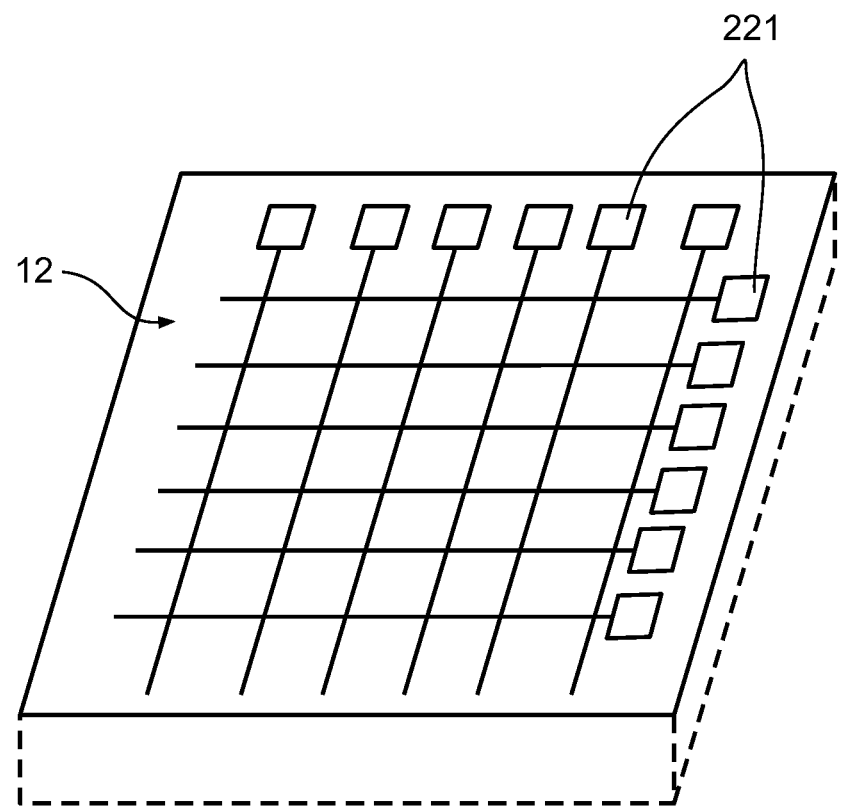
FIG. 2 illustrates a top view of simplified sensor grid of a digitizer in accordance with some embodiments of the present invention.
Figure 3:
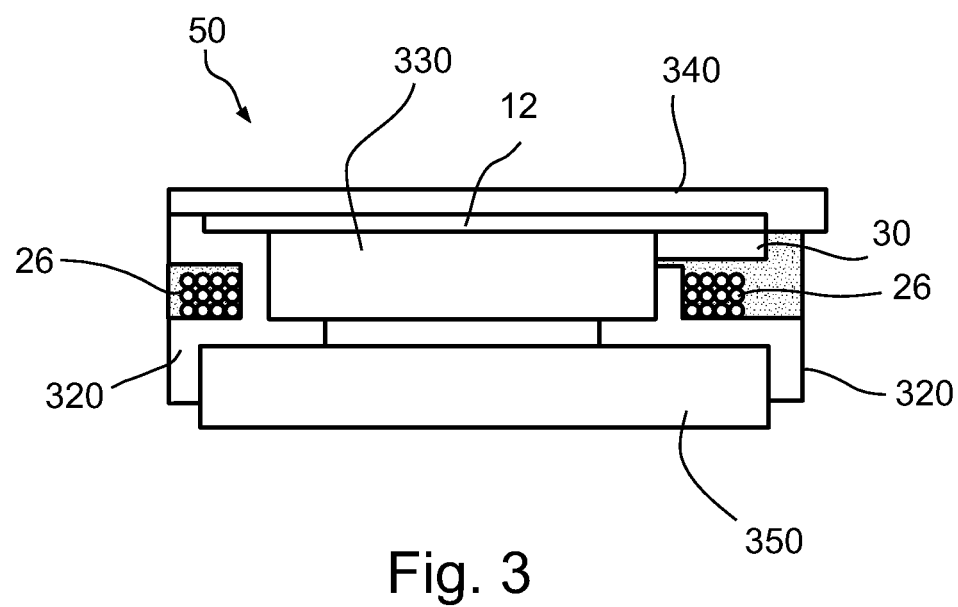
FIG. 3 illustrates a simplified cross sectional view of digitizer overlaid on a display in accordance with some embodiments of the present invention.

Reference is now made to FIGS. 1-3. FIG. 1 illustrates an exemplary simplified block diagram of a digitizer system in accordance with some embodiments of the present invention. FIG. 2 illustrates a top view of simplified sensor grid in accordance with some embodiments of the present invention. FIG. 3 illustrates a simplified cross sectional view of a digitizer overlaid on an FPD (or other) display in accordance with some embodiments of the present invention. Typically, digitizer system 100 shown in FIG. 1 includes a digitizer 50, overlaid on a display, a host computer 22, and an interface 24 between digitizer 50 and the host 22. Digitizer 50 may be suitable for any computing device that enables interactions between a user and the device, e.g. mobile computing devices that include, for example, FPD screens. Examples of such devices include Tablet PCs, pen enabled lap-top computers, tabletop computer, PDAs or any hand held devices such as palm pilots and mobile phones or other devices that facilitate electronic gaming. According to some embodiments of the present invention, the digitizer 50 comprises a grid based sensor 12 including a patterned arrangement of conducting lines, which is optionally transparent, and which is typically overlaid on a FPD 350 (FIG. 3). Typically, grid based sensor 12 includes horizontal and vertical gridlines positioned orthogonal from each other.

According to some embodiments of the present invention, circuitry is provided on one or more PCB(s) 30 positioned around sensor 12, e.g. along its edges, e.g. an L-shaped PCB. Typically, PCB(s) 30 is positioned along two edges of sensor 12 and connection to circuitry on PCB(s) 30 is via conductive pads and/or I/O terminals 221 (FIG. 2) included on edges of sensor 12. In some exemplary embodiments, PCB(s) is mounted on a frame 320. Optionally, PCB(s) 30 is mounted on sensor 12. According to some embodiments of the present invention, PCB(s) 30 include one or more ASICs 16 comprising circuitry to sample and process the sensor's output into a digital representation. In some exemplary embodiments, the digital output signal is forwarded to an additional ASIC, digital unit 20, for further digital processing. According to some embodiments of the present invention, digital unit 20 together with ASIC 16 serves as the controller of the digitizer system and/or has functionality of a controller and/or processor. Output from the digitizer sensor is forwarded to a host 22 via an interface 24 for processing by the operating system for operating any current application.

According to some embodiments of the present invention, digital unit 20 together with ASICs 16 include memory and/or memory capability. Memory capability may include volatile and/or non-volatile memory, e.g. FLASH memory. In some embodiments of the present invention, the memory unit and/or memory capability, e.g. FLASH memory is a unit separate from the digital unit 20 but in communication with digital unit 20. Typically, ASICs 16 function to process the received signals at a first processing stage.

According to some embodiments of the present invention, digitizer 50 includes a sensor grid 12 overlaid on a glass substrate 330, one or more PCBs 30, a sensor frame 320 and a peripheral coil 26 winded around the sensor frame. Optionally, frame 320 provides mechanical stability to sensor grid 12, secures peripheral coil 26 to a fixed position, and keeps the digitizer aligned with FPD or Liquid Crystal Display (LCD) 350. In some exemplary embodiments, frame 320 is excluded and the coil is a sub-assembly of digitizer 50. Optionally, the coil is a self-supported coil that does not require winding around a core. Hard coat 340 serves as a protective cover over which a user interacts with digitizer 50 using one or more types of user interaction, e.g. fingertip touch 46, stylus 44, and game tokens.

According to some embodiments of the present invention, sensor 12 comprises a grid of conductive lines made of conductive materials, optionally Indium Tin Oxide (ITO), patterned on a foil or glass substrate. The conductive lines and the foil are optionally transparent or are thin enough so that they do not substantially interfere with viewing an electronic display behind the gridlines. Typically, the grid is made of two layers, which are electrically insulated from each other. Typically, one of the layers contains a set of equally spaced parallel conductors and the other layer contains a set of equally spaced parallel conductors orthogonal to the set of the first layer. Typically, the parallel conductors are input to amplifiers included in ASIC 16. Optionally the amplifiers are differential amplifiers.

Typically, the parallel conductors are spaced at a distance of approximately 2-8 mm, e.g. 4 mm, depending on the size of the FPD and a desired resolution. Optionally the region between the gridlines is filled with a non-conducting material having optical characteristics similar to that of the (transparent) conducting lines, to mask the presence of the conducting lines. Optionally, the ends of the gridlines remote from PCB(s) 30 are not connected so that the gridlines do not form loops. In this case the gridlines act as high impedance electric field receiving antennas. Optionally only the ends of the gridlines proximal to PCB(s) 30 include I/O terminals.

Typically, ASIC 16 is connected to outputs of the various conductors in the grid and functions to process the received signals at a first processing stage. As indicated above, ASIC 16 typically includes an array of amplifiers, e.g. differential amplifiers, to amplify the sensor's signals. Additionally, ASIC 16 optionally includes one or more filters to remove frequencies that do not correspond to frequency ranges used for excitation and/or obtained from objects used for user interaction. Optionally, filtering is performed prior to sampling. The signal is then sampled by an A/D, optionally filtered by a digital filter and forwarded to digital ASIC unit 20, for further digital processing. Alternatively, the optional filtering is fully digital or fully analog. In some exemplary embodiments, signals ranging between 4-125 KHz can be detected by the digitizer sensor.

According to some embodiments of the invention, digital unit 20 receives the sampled data from ASICs 16, reads the sampled data, processes it and determines and/or tracks the position of physical objects, such as stylus 44, and/or finger 46, touching or placed in proximity over the digitizer sensor from the received and processed signals. Calculated position is sent to host computer 22 via interface 24. According to some embodiments of the present invention, digital unit 20 determines the presence and/or absence of physical objects, such as stylus 44, and/or finger 46 over time.

In some exemplary embodiments, an AC triggering signal, e.g. a pulsed AC signal, is applied to one or more parallel conductive gridlines in the grid. When a finger touches the gridline including the triggering signal, the capacitance between the conductive line through which triggering signal is provided and the corresponding orthogonal gridlines at least proximal to the touch position changes and an output signal due to this change is detected on the orthogonal conductive lines. This method is able to detect more than one finger touch at the same time (multi-touch). Typically, the presence of a finger decreases the coupled signal by 20-30% since the finger typically drains current from the lines.

According to some embodiments, digital unit 20 produces and controls the timing and sending of a triggering pulse to be provided to an excitation coil 26 that surrounds the sensor arrangement and the display screen. In an exemplary embodiment of the present invention, the excitation coil is connected to a capacitor which together forms a resonance circuit. In some exemplary embodiments, the excitation coil is configured to resonant at a plurality of pre-defined frequencies. In some exemplary embodiments of the invention, two ends of excitation coil 26 is connected to circuitry so that an AC signal can be transmitted to the excitation coil to produce a trigger pulse (in the form of an electric or electromagnetic field) that excites passive circuitry in stylus 44 or other object used for user interaction to produce a response from the stylus that can be subsequently detected.

According to some embodiments, digital unit 20 produces and sends a triggering pulse to at least one of the conductive gridlines. Typically the triggering pulses and/or signals are analog pulses and/or signals. According to some embodiments of the present invention, the triggering pulse and/or signal implemented may be confined to one or more pre-defined frequencies, e.g. 18 KHz or 20-40 KHz.

According to some embodiments of the present invention, digital unit 20 prompts, e.g. initiates, and controls self-diagnostic procedures to diagnose operation properties of digitizer system 100, e.g. self-diagnosis operational condition of the digitizer, as is described in further detail herein. In some exemplary embodiments, self-diagnostics is performed by digitizer 20 in the absence of user interaction with the digitizer.

According to some embodiments of the invention, host 22 includes at least a memory unit 23 and a processing unit 25 to store and process information obtained from digital unit 20. According to some embodiments of the present invention memory and processing functionality may be divided between any two or three of host 22, digital unit 20, and ASICs 16 or may reside in only one of them and/or may be a separated unit connected to at least one of host 22, digital unit 20, and ASIC 16. According to some embodiments of the present invention, one or more tables and/or databases may be stored to record one or more outputs, e.g. images or patterned outputs of sensor 12, sampled by ASIC 16 and/or digitizer unit 20. In some exemplary embodiments, a database of sampled output signals may be stored. Data and/or signal values may be stored in volatile and nonvolatile memory. According to some embodiments of the present invention, data and/or signal values may be stored as tables of spatial output of the digitizer sensor and/or differential amplifier output of the digitizer sensor. According to some embodiments of the present invention outputs are recorded after filtering, e.g. after low pass and/or band-pass filtering to select outputs from frequency ranges corresponding outputs from objects used for user interaction, e.g. outputs from a frequency range corresponding to finger detection.

Digitizer systems used to detect stylus and/or finger tip location may be, for example, similar to digitizer systems described in incorporated U.S. Pat. No. 6,690,156, U.S. Pat. No. 7,292,229 and/or U.S. Pat. No. 7,372,455. Systems and methods of the present invention may also be applicable to other digitized systems known in the art, depending on their construction.

Figure 4A:
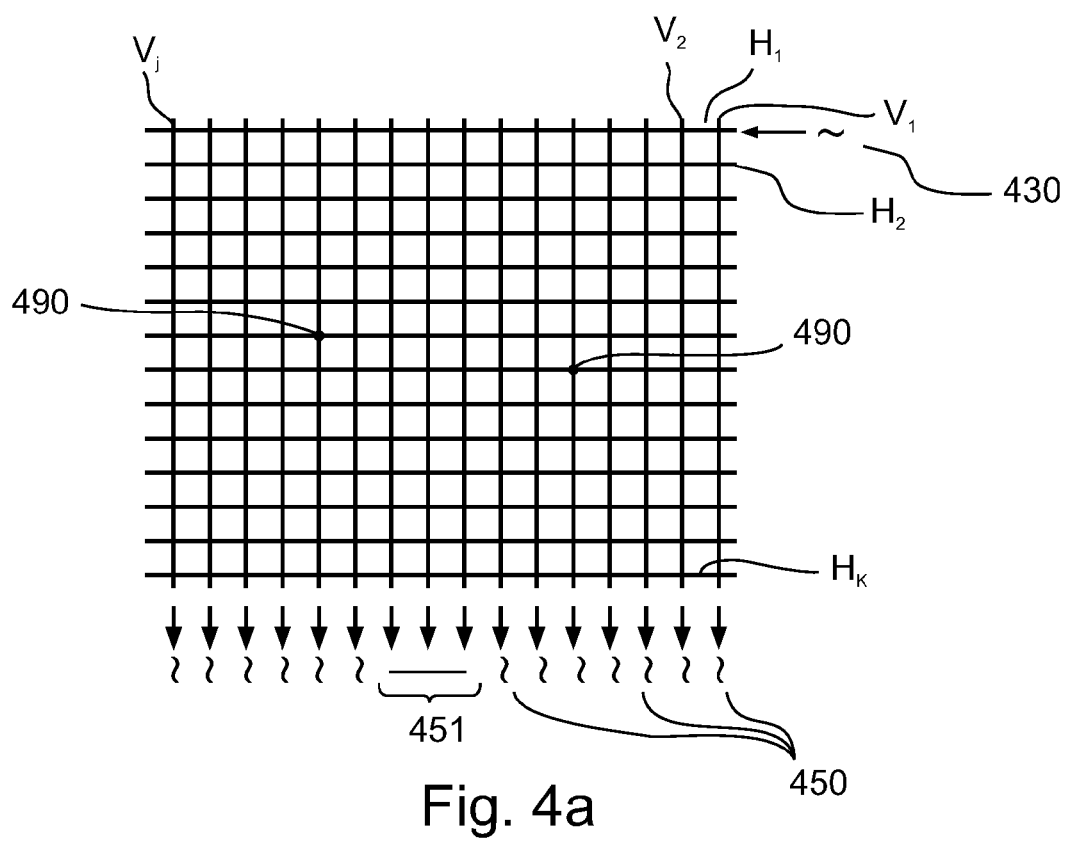
FIGS. 4A-4D illustrates sample input and output signals to and from a sensor grid during self-diagnosis of electrical connection between the sensor grid and the surrounding circuitry in accordance with some embodiments of the present invention.
Figure 4B:
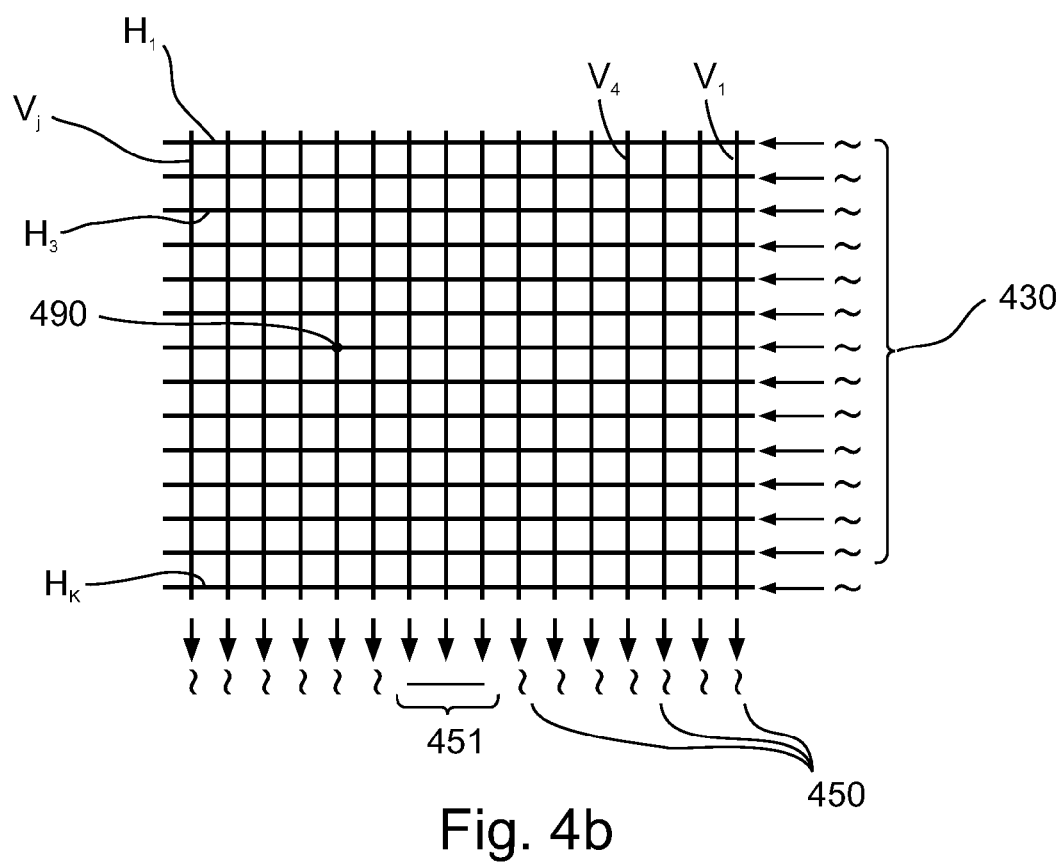
Figure 4C:
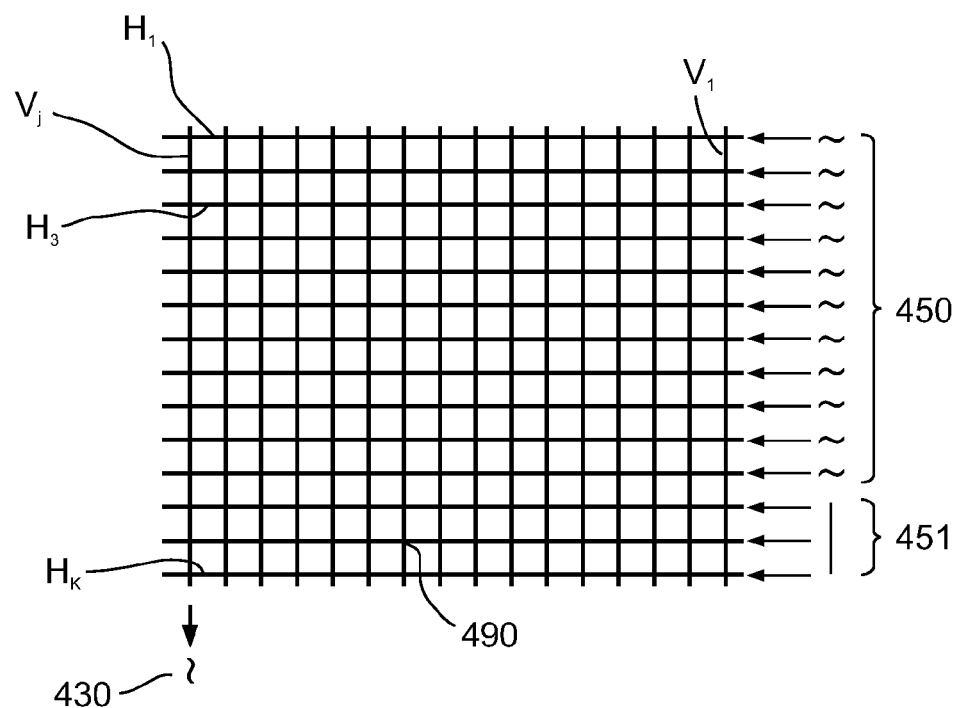

Reference is now made to FIGS. 4A-4D illustrating sample input and output signals from a sensor grid during self-diagnosis of electrical connection between the sensor grid and the surrounding circuitry in accordance with some embodiments of the present invention. In some exemplary embodiments, the sensor grid is a rectangular grid including a first set of parallel conductive gridlines $H_1$ to $H_k$, e.g. in the horizontal direction, and a second set of parallel conductive gridlines $V_1$ to $V_j$, e.g. in the vertical direction, positioned orthogonally from the first set of gridlines and electrically insulated from the first set of gridlines. Circuitry connected along two edges of the rectangular grid functions to transmit signals along the gridlines and sample signals propagating on the gridlines. At each junction 490 between two cross gridlines, a certain minimal amount of capacitance exists. Due to the capacitive coupling between cross gridlines, signals transmitted across one of the gridlines generate coupled signals along its crossing gridlines, e.g. orthogonal gridlines. According to some embodiments of the present invention, circuitry associated with one axis of the grid, e.g. horizontal or vertical axis, transmits and/or imposes an AC signal 430 along one of the gridlines, e.g. a horizontal gridline $H_1$ (FIG. 4A) or vertical gridline $V_j$ (FIG. 4C). In some exemplary embodiments, signal 430 is a pulsed AC signal. Due to capacitive coupling, coupled signals 450 are generated on the orthogonal gridlines that can be detected during sampling of the gridlines. When the orthogonal gridlines are properly connected to the I/O terminals and/or to the output circuitry, coupled signal 450 is detected during sampling. In cases when a gridline is not connected, a null signal 451, e.g. a low amplitude signal, is detected by the circuitry. In some exemplary embodiments, ASICs 16 samples each of the cross gridlines. Analysis of the sampled signal is performed by ASICs 16 and/or digital ASIC 20 and disconnected gridlines can be identified and recorded. Although, in FIG. 4A the input AC signal is transmitted through gridline $H_1$, it is noted that the input signal can instead be transmitted to any of the other parallel gridlines $H_2$ to $H_k$ to determine connectivity of gridlines $V_1$ to $V_j$. In some exemplary embodiments, an input signal is transmitted through the conductive gridline that is furthest away from circuitry associated with the cross gridlines, e.g. $H_1$.

Figure 5:
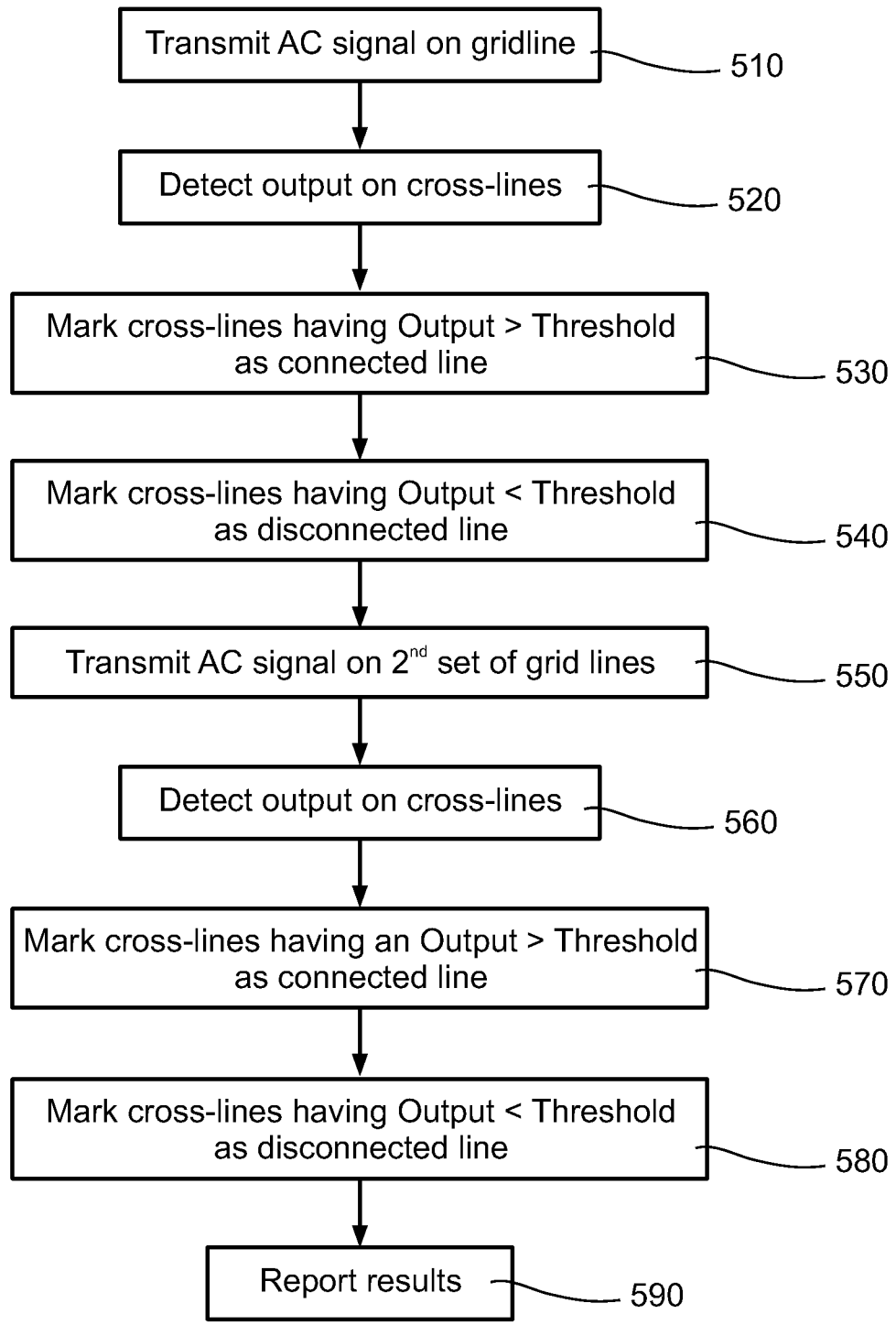
FIG. 5 shows a simplified flow chart of an exemplary method for a digitizer to self-diagnose disconnected gridlines on a sensor grid in accordance with some embodiments of the present invention.

Reference is now made to FIG. 5 showing a simplified flow chart of an exemplary method for detecting disconnected gridlines on a sensor grid in accordance with some embodiments of the present invention. According to some embodiments of the present invention, during self-diagnostics an input signal is transmitted along one of a first set of gridlines associated with a first axis, e.g. horizontal or vertical axis (block 510) to test connection of the second set of gridlines associated with a second axis crossing the first axis, e.g. positioned orthogonally to the first set. Output from the second set is sampled (block 520) and compared with a threshold, e.g. pre-defined threshold and/or a threshold that is determined from an average signal sampled over a plurality of gridlines. Gridlines of the second set associated with outputs above the pre-defined threshold are marked as connected gridlines (block 530). Gridlines of the second set associated with outputs below the pre-defined threshold are marked as disconnected gridlines (block 540). Subsequently an input signal is transmitted along one of the second set of gridlines in the grid to test connection of the first set (block 550). Output from the first set is sampled (block 560) and compared with a threshold, e.g. pre-defined threshold. Gridlines of the first set corresponding to outputs above the pre-defined threshold are marked as connected gridlines (block 570). Gridlines of the first set corresponding to outputs below the pre-defined threshold are marked as disconnected gridlines (block 580). Results of the connectivity test can be relayed to the user, to digital ASIC 20 and/or to the host (block 590). Based on the results, a decision can be made as to the usability of the sensor grid. Typically, the decision is made on the firmware level. In some exemplary embodiments, the decision is made on the software level, e.g. by host computer 22 based on data received from digitizer 50. In some exemplary embodiments, when one gridline is disconnected, the entire sensor is diagnosed as damaged and/or malfunctioning. Optionally, the location of the disconnected gridline and/or the accuracy required by the applications used with the digitizer is considered before diagnosing a sensor as unusable. For example, if one gridline at the edge of the sensing area is disconnected, the sensor grid may be defined as partially malfunctioning. In some exemplary embodiments, problematic gridlines are neutralized, e.g. not sampled or output from the gridline is not included in analysis while tracking and/or locating user interactions interacting with the digitizer.

According to some embodiments of the self-diagnostic routine is an application which runs on firmware. Optionally, self-diagnostic routines are initiated by the user and can run under manual control. Typically, diagnosis is first performed at manufactured site and then periodically repeated.

Figure 4D:
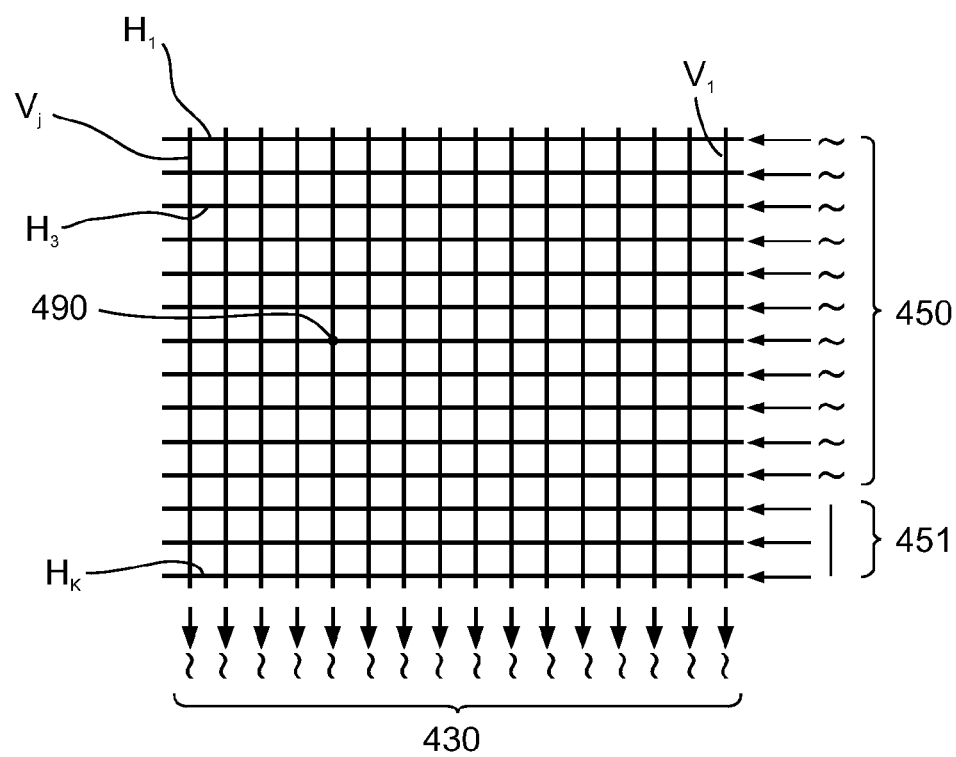

In some exemplary embodiments, when output from all the cross gridlines are found to be below the pre-defined threshold, the gridline used for transmitting an input signal is marked as disconnected and the diagnosis is repeated using a different gridline for propagating the input signal. In some exemplary embodiments more than one gridline is used to transmit an input signal, e.g. concurrently or consecutively. In some exemplary embodiments, transmitting signals over more than one gridline overcomes false detection resulting from problems in the input gridline as opposed to the cross gridlines. In some exemplary embodiments, e.g. as shown in FIGS. 4B and 4D, input signal are concurrently transmitted over all gridlines of the first set, e.g. $H_1$ to $H_k$, to test connections of the second set of gridlines (FIG. 4B). Subsequently, input signals are simultaneously transmitted over all the gridlines in the second set, $V_1$ to $V_j$, to test connections of the gridlines in the first set (FIG. 4D).

According to some embodiments of the present invention, during diagnosis, e.g. self-diagnosis, input signals to the sensor grid are transmitted at the maximum magnitude applicable by the digitizer. Optionally, the input signal is transmitted at a frequency typically used for finger touch detection. Optionally, the transmitted input signal includes a plurality of frequencies.

According to some embodiments of the present invention, one or more methods are used for analysis of sampled output signals during diagnosis of operative properties of a sensor grid. In some exemplary embodiments, one or more methods are used for thresholding, e.g. to determine if a detected output signal represents a null signal and/or a coupled signal.

In some exemplary embodiments, thresholding is performed at a pre-defined frequency and/or frequency range. Optionally, the pre-defined threshold is a threshold on energy of the output signal at a detected peak, at a pre-defined frequency, pre-defined frequencies, and/or pre-defined frequency band. Optionally, the output signal is compared to the threshold in the frequency domain, e.g. subsequent to performing Discrete Fourier Transformation (DFT).

In some exemplary embodiments, thresholding is performed on an average output detected over multiple cycles and/or average output detected in response to input transmitted over a plurality of gridlines. In some exemplary embodiments, averaging a plurality of signals serves to reduce noises and prevent potential false positive and/or false negative detection.

In some exemplary embodiments, the threshold is defined in reference to an average signal detected on all the sensor gridlines. Optionally, a threshold for each axis is defined in reference to an average signal detected on each axis. Optionally, a threshold is defined as a fraction of the average value of the detected signals, e.g. 0.3, 0.4, 0.5, 0.6, 0.7, 0.8, 0.9 times the average value. In some exemplary embodiments, more than one threshold is used and gridlines can be marked as fully connected, partially disconnected and/or disconnected. In some exemplary embodiments, a gridlines is diagnosed as a connected gridline, when the output signal is within and or greater than one standard deviation of the average signal detected. In some exemplary embodiment of the present invention, instead of comparing an output signal with a pre-defined threshold, the output signal is compared with its neighbor output signals. Optionally, an average value of neighbor's output signals is performed. If the output is above an average value of neighboring output signals (or above some defined multiple of the average value), the corresponding gridline is diagnosed as a connected gridline. If the output is below said average (or below some defined multiple of the average value), the corresponding conductive gridline is diagnosed as a disconnected gridline. In some exemplary embodiments, each gridline is tested for connectivity. In other embodiments, specific gridlines are tested, e.g. corresponding to a specified area.

In some exemplary embodiments, methods similar to the method described herein for identifying disconnected gridlines are also used for detecting breaks in gridlines, shorts between gridlines and/or cross talk between gridlines.

In some exemplary embodiments, methods similar to the method described herein for detecting disconnected gridlines can a be used for detecting degradation in signal levels as the signal propagates from the signal source to the end of the gridline. In some exemplary embodiments, degradation is detected by comparing signal strengths of output from the different cross gridlines. Typically the signal strength on cross gridlines furthest away from the input signal source, e.g. cross gridline $V_j$ (FIG. 4A), will result in lower signal strengths as compared to cross gridlines closest to the signal source, e.g. cross gridline $V_1$ (FIG. 4A). In some exemplary embodiments, the level of degradation is detected and compensated for with a calculated compensation factors. In some exemplary embodiments, degradation detection and compensation is performed automatically by the digitizer and is part of the self-diagnostic procedure. In some exemplary embodiments, compensation is implemented to adjust threshold for individual gridlines on gridlines, e.g. decrease threshold between $V_1$ and $V_j$. In some exemplary embodiments, the digitizer determines and/or conveys that the sensor grid is malfunctioning for detected degradation levels above a pre-defined threshold and 'repairs' or compensates for degradation below a pre-defined threshold.

Figure 6A:
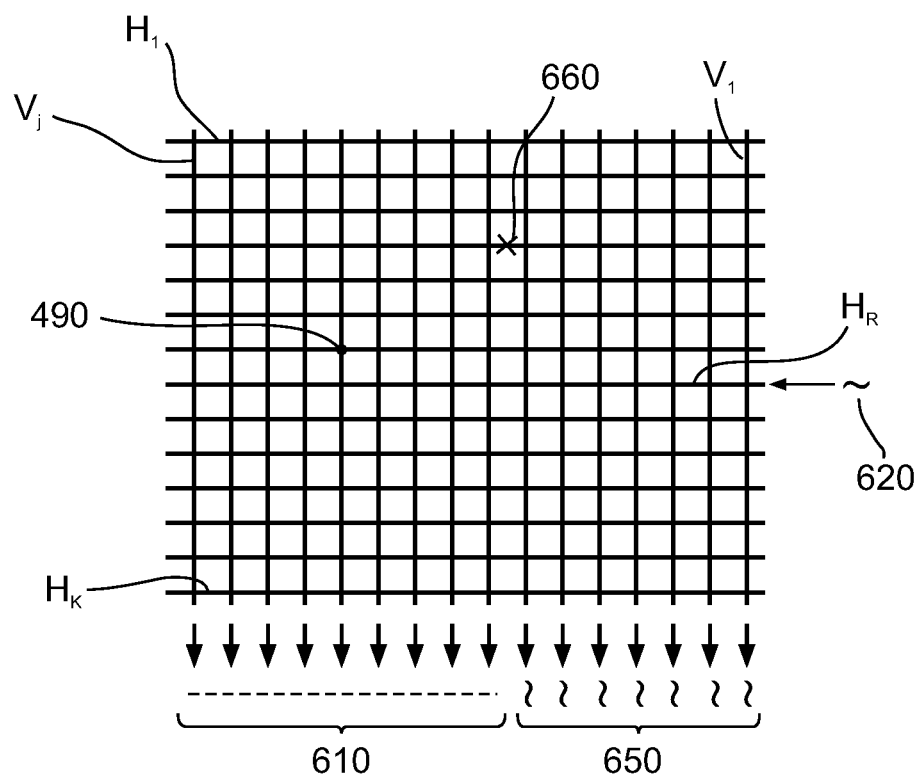
FIGS. 6A-6B illustrates sample input and output signals to and from a sensor grid during self-detection of breaks in one or more sensor gridlines in accordance with some embodiments of the present invention.
Figure 6B:
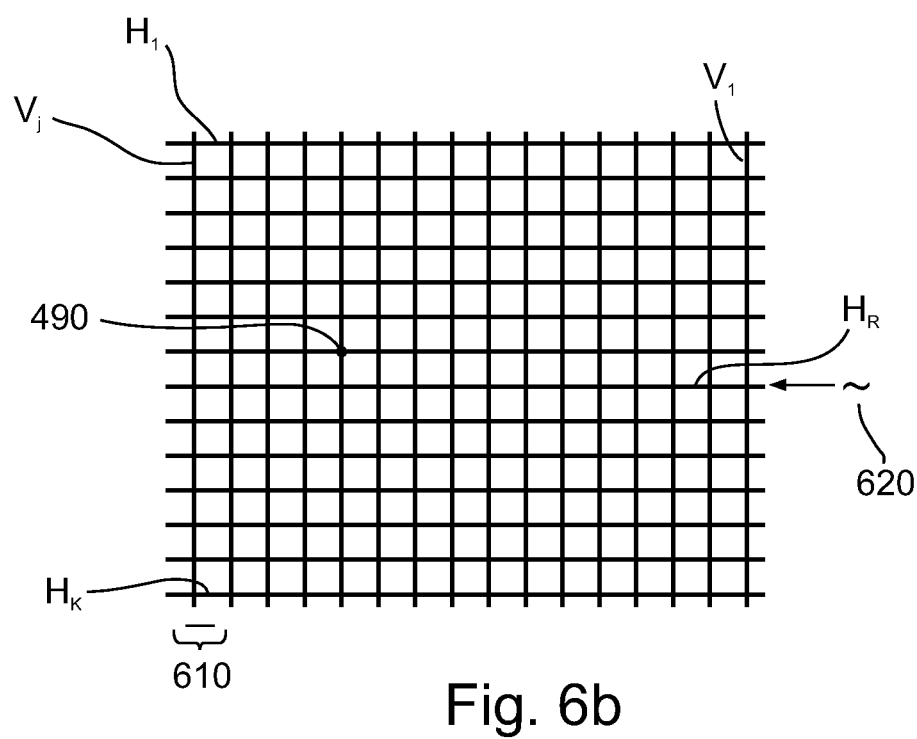

Reference is now made to FIGS. 6A-6B showing sample input and output signals to and from a sensor grid during self-detection of breaks in one or more sensors gridline in accordance with some embodiments of the present invention. According to some embodiments of the present invention, a cut 660 in an input gridline $H_R$ can be detected from analysis of detected coupled signals in gridlines crossing the input gridline. According to some embodiments of the present invention, an input signal 620 generated by circuitry of the sensor grid is propagated through each of the gridlines in sequence while signals on one or more cross gridlines are sampled. Output signals are analyzed to determine if there is a cut in the input gridline. In some exemplary embodiments, the presence as well as the location of the cut along the input gridline is determined. For example, when sampling the cross gridline output, signals 650 is detected on gridlines crossing the length of the input gridline that is intact while null signal 610 is detected past the point were the gridline is cut. The position of the cut is defined between the point along the input gridline where signal 650 is detected and the point where null signals 610 are detected. Referring now to FIG. 6B, in some exemplary embodiments, only the cross gridline furthest from the signal source is sampled to determine if there is a cut in the input gridline. If a null signal 610 is sampled on the cross gridline furthest from the signal source, the input gridlines is determined to have a break. In some exemplary embodiments, $V_j$ is first tested for breaks to insure that the detected break is not a break in $V_j$. Alternatively, if coupled signal, e.g. signal 650, is sampled on the cross gridline furthest from the signal source, the input gridlines is determined to be intact. In some exemplary embodiments, only a plurality of cross gridlines furthest from the signal source is sampled. In such exemplary embodiments, only the presence of a cut is detected and not its position along the length of the gridline.

In some exemplary embodiments, only a selected number of cross gridlines are sampled to determine a break in a gridline. For example, every second, third, fifth, tenth gridline is sampled and/or analyzed to determine presence and location of a break.

Figure 7:
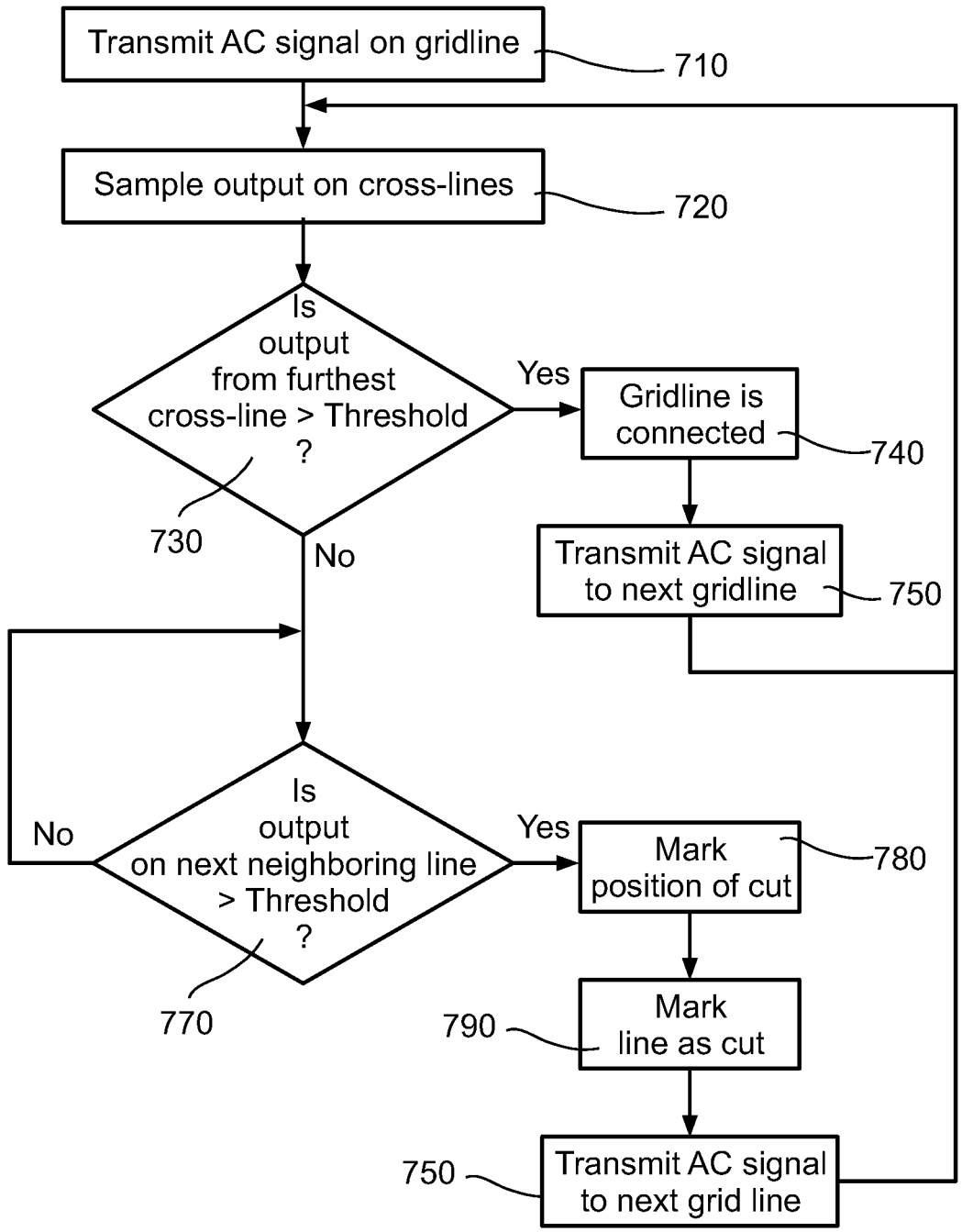
FIG. 7 shows a simplified flow chart of an exemplary method for detecting a break in a sensor gridline in accordance with some embodiments of the present invention.

Reference is now made to FIG. 7 showing a simplified flow chart of an exemplary method for detecting a break in a sensor gridline in accordance with some embodiments of the present invention. According to some embodiments, an AC signal is transmitted along one of the gridlines, e.g. a first gridline (block 710) and output from the cross gridlines are sampled (block 720). In some exemplary embodiments, analysis of output begins on the cross gridline furthest from the input signal source and the output from the furthest gridline is compared to a threshold (block 730). In cases when the output on the furthest cross gridline shows a coupled signal, e.g. the output is greater than the threshold, the input gridline propagating the input signal is marked as an intact gridline (block 740) and a subsequent input gridline is diagnosed (block 750). In cases when the output on the furthest cross gridlines shows a null signal, e.g. a signal below the threshold, neighboring cross gridlines are compared to the threshold in sequence (block 770) until a signal above the threshold is detected. If no signals above the threshold is detected on any of the cross gridlines, the input gridline is marked as disconnected. The position of a break or cut on a gridline is determined as the position between the last null signal, e.g. below the threshold, and the first coupled signal, e.g. a signal above the threshold (block 780). The input gridline is marked as cut (block 790) and a subsequent input gridline is diagnosed. In some exemplary embodiments, this process continues until all the gridlines have been checked. Optionally, the diagnosis is performed over a specific area of the grid.

According to some embodiments of the present invention, the different methods described herein above for determining if a detected output signal represents a null signal and/or a coupled signal can be applied for diagnosis of a cut gridline. In some exemplary embodiments, each set of gridlines are sampled a plurality of times and analysis of output is performed based on averages or other methods described herein above.

Figure 8A:
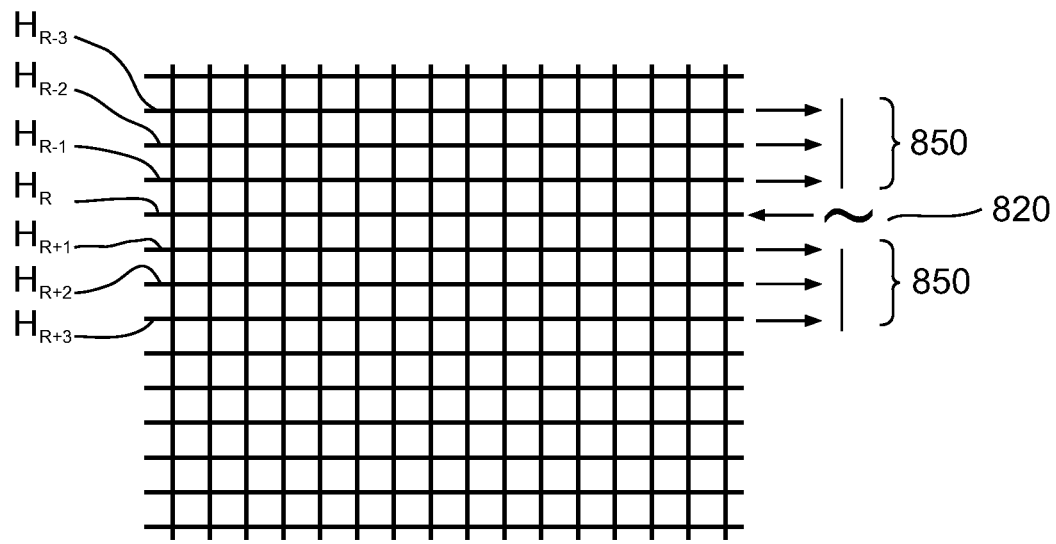
FIG. 8A-8B illustrate sample input and output signals to and from a sensor grid during diagnosis of shorts and/or cross-talk between neighboring gridlines in a sensor grid in accordance with some embodiments of the present invention.
Figure 8B:
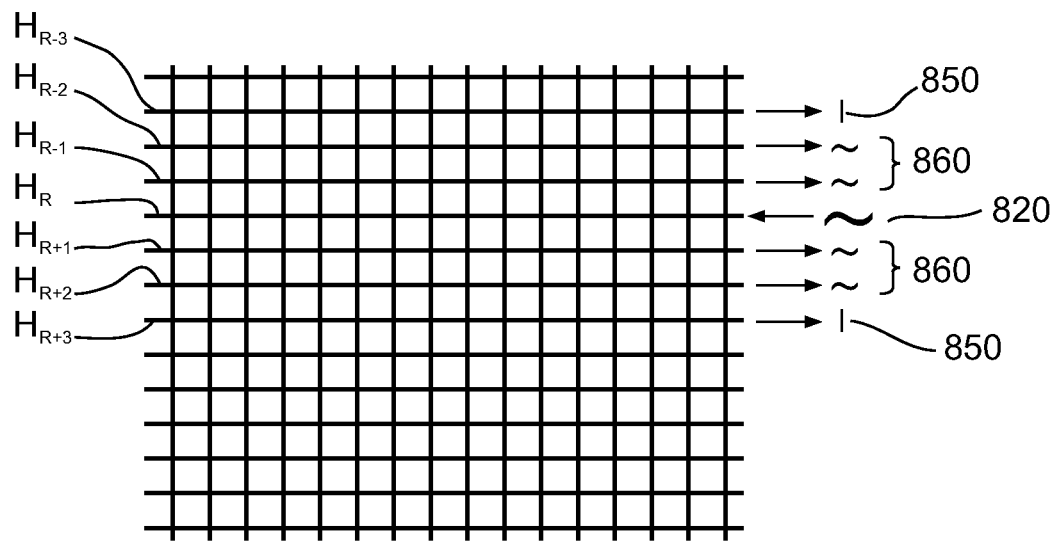

Reference is now made to FIGS. 8A-8B illustrating sample input and output signals to and from a sensor grid during diagnosis of shorts and/or cross-talk between neighboring gridlines in a sensor grid in accordance with some embodiments of the present invention. According to some embodiments of the present invention, shorts and/or cross-talks between gridlines are determined by transmitting a signal 820 through one gridline $H_R$ and sampling output in two or more neighboring gridlines, e.g. gridlines $H_{R-3}$ to $H_{R-1}$ and $H_{R+1}$ to $H_{R+3}$. If signals are detected on the neighboring gridline, a short and/or cross talk between the gridlines is determined. In the example shown in FIG. 8A, the neighboring gridlines produced null signals 850 in response to input signal 820 so that no short and/or cross talk was found. In FIG. 8B, a signal 860 was sampled on gridlines $H_{R-2}$, $H_{R-1}$, $H_{R+1}$, and $H_{R+2}$ indicating that there is either cross-talk and/or a short between gridlines $H_{R-2}$ and $H_{R+2}$. In some exemplary embodiments, only the two gridlines neighboring the input gridline are analyzed to determine if a short or cross-talk exists. In some exemplary embodiments, only if a signal is detected on one of the two neighboring gridlines, additional neighboring gridlines are analyzed until no signal is detected. In some exemplary embodiments, initially more than two neighboring gridlines are analyzed and additional gridlines are analyzed in response to a detected signal on the previous group of gridlines analyzed. According to some embodiments of the present invention, cross-talk and/or shorting is determined if output from a gridline is above a pre-defined threshold. In some exemplary embodiments, methods similar to the methods described herein above for thresholding is implemented to determine if an output signal indicates cross-talk and/or shorting between gridlines. In some exemplary embodiments, each set of gridlines are sampled a plurality of times and analysis of output is performed based on averages or other methods described herein above.

Figure 9:
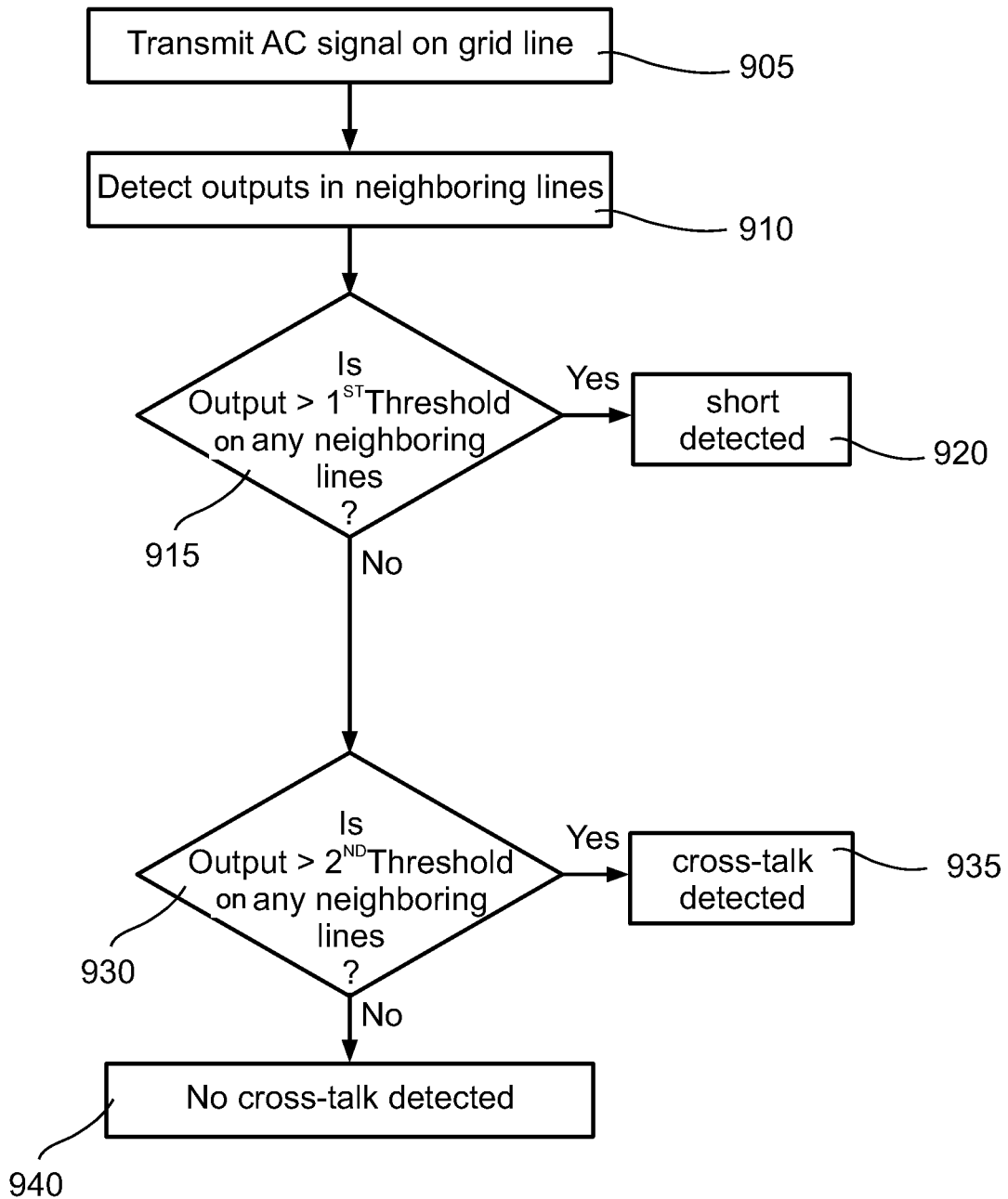
FIG. 9 shows a simplified flow chart of an exemplary method for detecting a short and/or cross-talk between neighboring gridlines in a sensor grid in accordance with some embodiments of the present invention.

Reference is now made to FIG. 9 showing a simplified flow chart of an exemplary method for detecting a short and/or cross-talk between neighboring gridlines in a sensor grid in accordance with some embodiments of the present invention. According to some embodiments of the present invention, an AC signal is transmitted and/or imposed on one of the gridlines of the sensor (block 905). Typically circuitry associated with the gridline generates and transmits the AC signal, e.g. a pulsed AC signal, to the gridline. Outputs from at least the neighboring gridlines are sampled (block 910). In some exemplary embodiments all gridlines parallel to the input gridline are sampled. Output of two or more neighboring gridlines is checked against a first threshold (block 915). If the sampled output on one of the gridlines is above the threshold, a short is determined in the sensor grid (block 920). In some exemplary embodiments the area on the grid where the short was detected is recorded and reported to the host computer or to the user via the host computer. In some exemplary embodiments, if a short on one of the gridlines is detected, the entire sensor grid is determined to be malfunctioning. In some embodiments, gridlines generating shorts are neutralized and/or not used during operation of the digitizer, e.g. not used to locate and/or track user interaction with the digitizer.

In some exemplary embodiments, if all the analyzed signals are below the first threshold, e.g. a short has not been detected, the possibility of cross-talk is determined. In some exemplary embodiments, the output is checked against a second threshold lower than the first threshold (block 930). If one or more gridlines is found to be above the second threshold, it is determined that cross-talk exists between the gridlines (block 935). Otherwise the input gridline is determined to be free from shorts and cross-talk (block 940). Typically steps 905-940 are repeated for each of the gridlines on the grid, e.g. each horizontal gridline and each vertical gridline, to determine if shorts and/or cross-talks exist between the sensor gridlines. In some exemplary embodiments, only specific gridlines are tested, e.g. gridlines corresponding to a specified area. In some exemplary embodiments, gridlines that are shorted or suffer from cross talk are neutralized. In some exemplary embodiments, any short or cross talking detected results in reporting that the sensor grid unusable.

Figure 10:
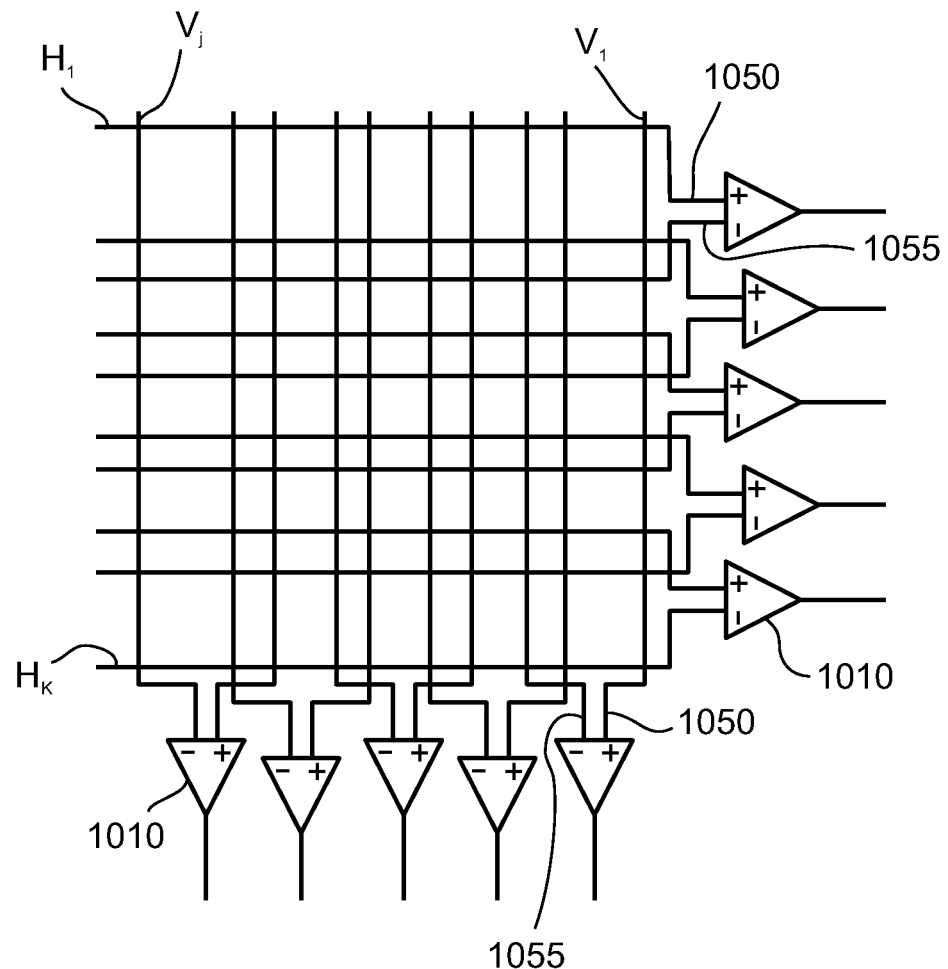
FIG. 10 shows a simplified exemplary sensor grid including pairs of sensor gridlines that are input to differential amplifiers in accordance with some embodiments of the present invention.
Figure 11A:
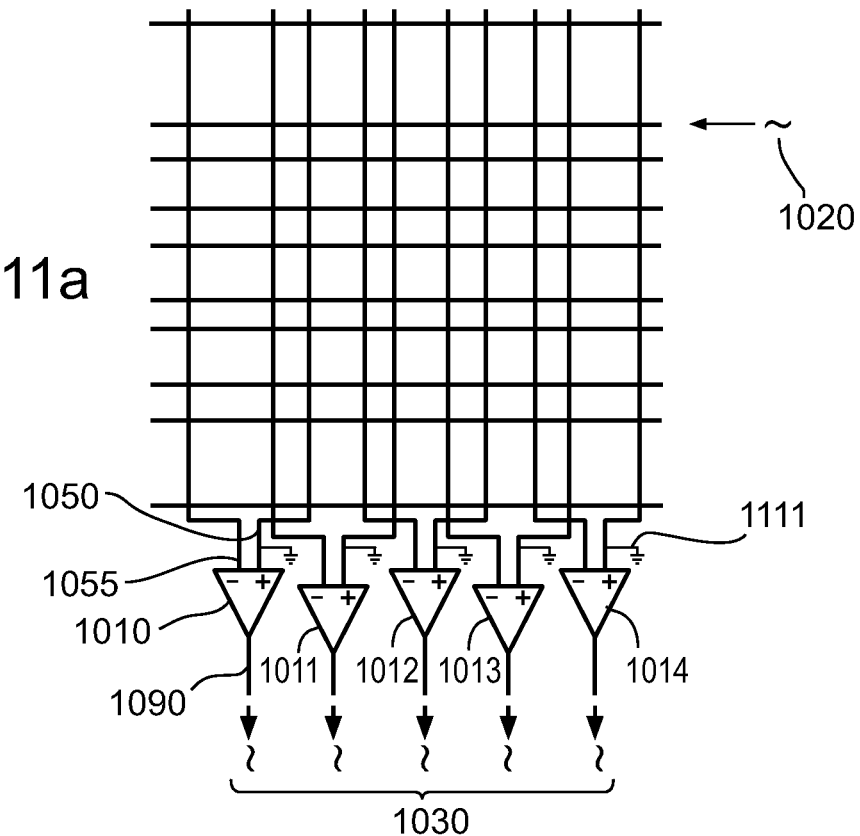
FIGS. 11A-11B illustrate sample output signals from differential amplifiers associated with the sensor grid during self-diagnosis of electrical connection between the sensor grid and the surrounding circuitry in accordance with some embodiments of the present invention.
Figure 11B:
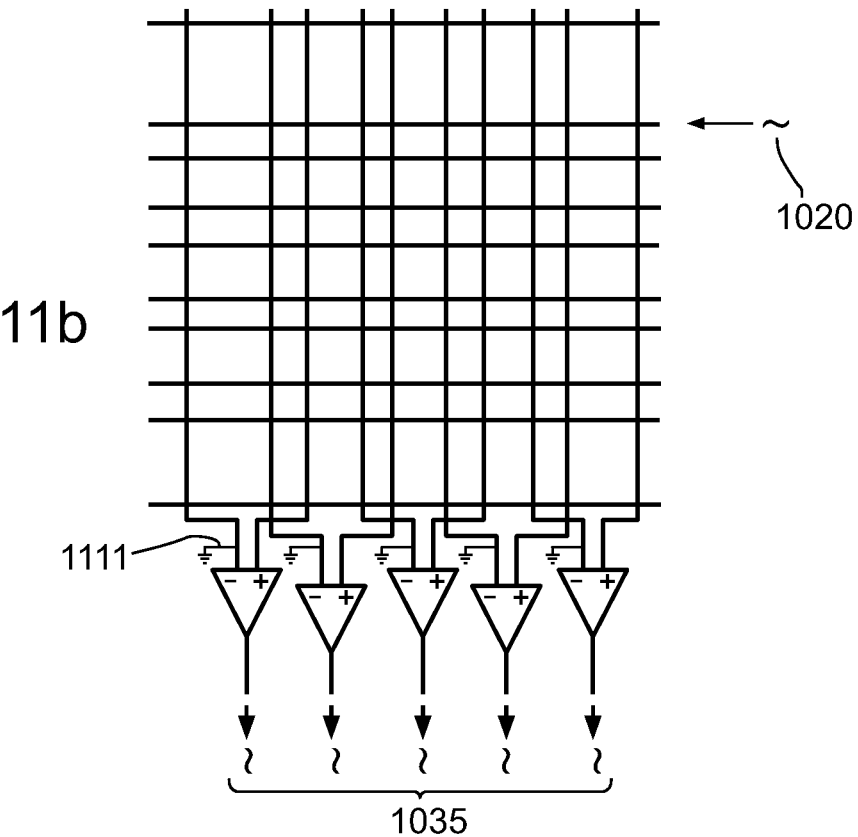
Figure 12:
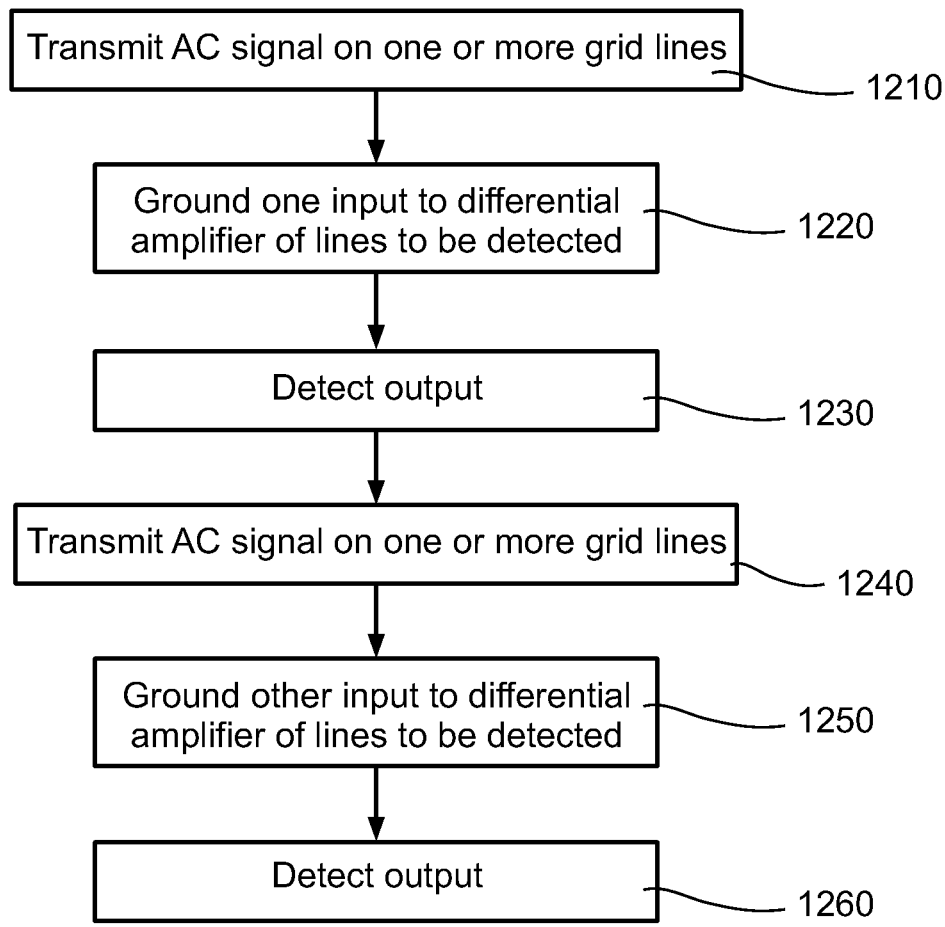
FIG. 12 shows a simplified flow chart of an exemplary method for detecting operational properties of gridlines on a sensor grid that are input to differential amplifiers in accordance with some embodiments of the present invention.

Reference is now made to FIGS. 10, 11A-11B, and 12. FIG. 10 shows a simplified exemplary sensor grid including pairs of sensor gridlines that are input to differential amplifiers in accordance with some embodiments of the present invention. FIGS. 11A-11B illustrate sample output signals from differential amplifiers associated with the sensor grid during self-diagnosis of electrical connection between the sensor grid and the surrounding circuitry in accordance with some embodiments of the present invention. FIG. 12 shows a simplified flow chart of an exemplary method for detecting operational properties of gridlines on a sensor grid that are input to differential amplifiers in accordance with some embodiments of the present invention.

Typically, in ASICs 16 amplification is performed prior to sampling and therefore the sampled output is a differential output between the two gridlines, e.g. gridline 1050 and gridline 1055, that are input to the differential amplifier. According to some embodiments of the present invention, ASICs 16 include an array of differential amplifiers 1010 to amplify the sensor's signals. Optionally, ASIC 16 performs filtering prior to sampling. In some exemplary embodiments, gridlines $H_1$ to $H_k$ and/or $V_1$ to $V_j$ are connected pairwise to differential amplifiers. The present invention is not limited to the illustrated configuration. Optionally, adjacent gridlines are connected pairwise to differential amplifiers.

Typically, to diagnose operation properties of a sensor grid as described herein, output from individual gridlines are analyzed. Analysis of sampled output obtained through differential amplifiers to detect operation malfunction of the sensor gridlines may be difficult. For example, the output from a differential amplifier having input from two intact gridlines may be similar to the output from a differential amplifier having input from two disconnected gridlines. As such, output from the differential amplifier may lead to ambiguous results. The present inventors have found that output from individual gridlines connected to differential amplifier can be isolated to avoid ambiguity by connecting one input, e.g. input 1050, of each of the differential amplifiers, e.g. differential amplifier 1010, to ground 1111. In some exemplary embodiments, ASIC(s) 16 provides an electrical connection between the gridline to be grounded and PCB ground. While input 1050 to differential amplifier 1111 is grounded, output line 1090 of the differential amplifier corresponds to output from gridline 1050 and not to a difference between two gridline 1050 and gridline 1055.

Referring now to FIG. 11A, while all the positive inputs to differential amplifiers along a first axis of a grid are grounded, a signal 1020 is propagated on one gridline along a second axis of the grid and output is detected from each of the differential amplifiers associated with the first axis of the grid, e.g. differential amplifiers 1010-1014. Analysis of signal 1030 obtained from the differential amplifier can be used to diagnosed connectivity of gridlines that serve as negative input to each of the differential amplifiers.

Referring now to FIG. 11B, while all the negative inputs to differential amplifiers along a first axis of a grid are grounded, a signal 1020 is propagated on one gridline along a second axis of the grid and output is detected from each of the differential amplifiers associated with the first axis of the grid, e.g. differential amplifiers 1010-1014. Analysis of signal 1035 obtained from the differential amplifier can be used to diagnosed connectivity of gridlines that serve as positive input to each of the differential amplifiers. Analysis of sampled output may be as described herein. In some exemplary embodiments, each set of gridlines are sampled a plurality of times and analysis of output is performed based on averages or other methods described herein above.

Referring now to FIG. 12, according to embodiments of the present invention, an AC signal is transmitted on one or more gridlines (block 1210), e.g. on one or more gridlines along a $1^{st}$ axis of a grid. One of the inputs to each differential amplifiers, e.g. positive or negative input, associated with cross gridlines, e.g. gridlines along a $2^{nd}$ axis of a grid is grounded (block 1220). Output is sampled from the differential amplifiers of the cross lines (block 1230). Sampled output represents output from only a portion of the sensor grid, e.g. half the sensor grid. Subsequently, the AC signal is transmitted on the one or more gridlines (block 1240) while the other input to each differential amplifier associated with cross gridlines is grounded (and the first input is not grounded) (block 1250). Output is sampled from the differential amplifiers of the cross gridlines (block 1260). Sampled output represents output from the rest of the gridlines of the sensor grid previously not detected, e.g. the second half the sensor grid. In some exemplary embodiments, based on output from the first and second sampling, diagnosis of the entire grid can be performed. In some exemplary embodiments, each set of gridlines are sampled a plurality of times and analysis of output is performed based on averages or other methods described herein above.

According to embodiments of the present invention, operative properties of a grid, e.g. connectivity of gridlines and connecting circuitry, electric breaks in gridlines, cross-talk and shorts between gridlines as described herein above, can be determined for digitizers whose output is sampled from differential amplifiers as described herein above.

According to some embodiments of the present invention, self-diagnosis includes diagnosis of electrical connections between the excitation coil and the circuitry. The present inventors have found that when the electrical connections of the excitation coil are intact and an AC signal is transmitted through the coil, a signal with a peak at the resonance frequency and/or excitation frequency of the coil can be detected on output from the sensor gridlines. Typically, null signals are detected from the output of the gridlines when the excitation coil is disconnected from both ends and/or when an excitation signal is not transmitted through the coil.

The present inventors have also found that while the excitation coil is disconnected only on end, signals detected from output of the gridlines typically have a greater amplitude than the signals picked up with the excitation coil is disconnected on both ends. In addition, the present inventors have found that while the excitation coil is disconnected on one end, the signals detected from output of the gridlines do not show a peak at the resonance frequency of the coil. The present inventors have found that by analyzing output from one or more gridlines while an AC signal is transmitted to the coil, the operational state of the excitation coil can be determined and the condition of fully disconnected and partially disconnected excitation coil can be distinguished.

According to some embodiments of the present invention, an AC signal including a plurality of frequencies is transmitted to the excitation coil during self diagnosis. Typically the plurality of frequencies includes one or more resonant frequencies of the excitation coil. In some exemplary embodiments, during self-diagnosis, the input signal to the excitation coil is transmitted at the maximum magnitude applicable by the system.

Figure 13:
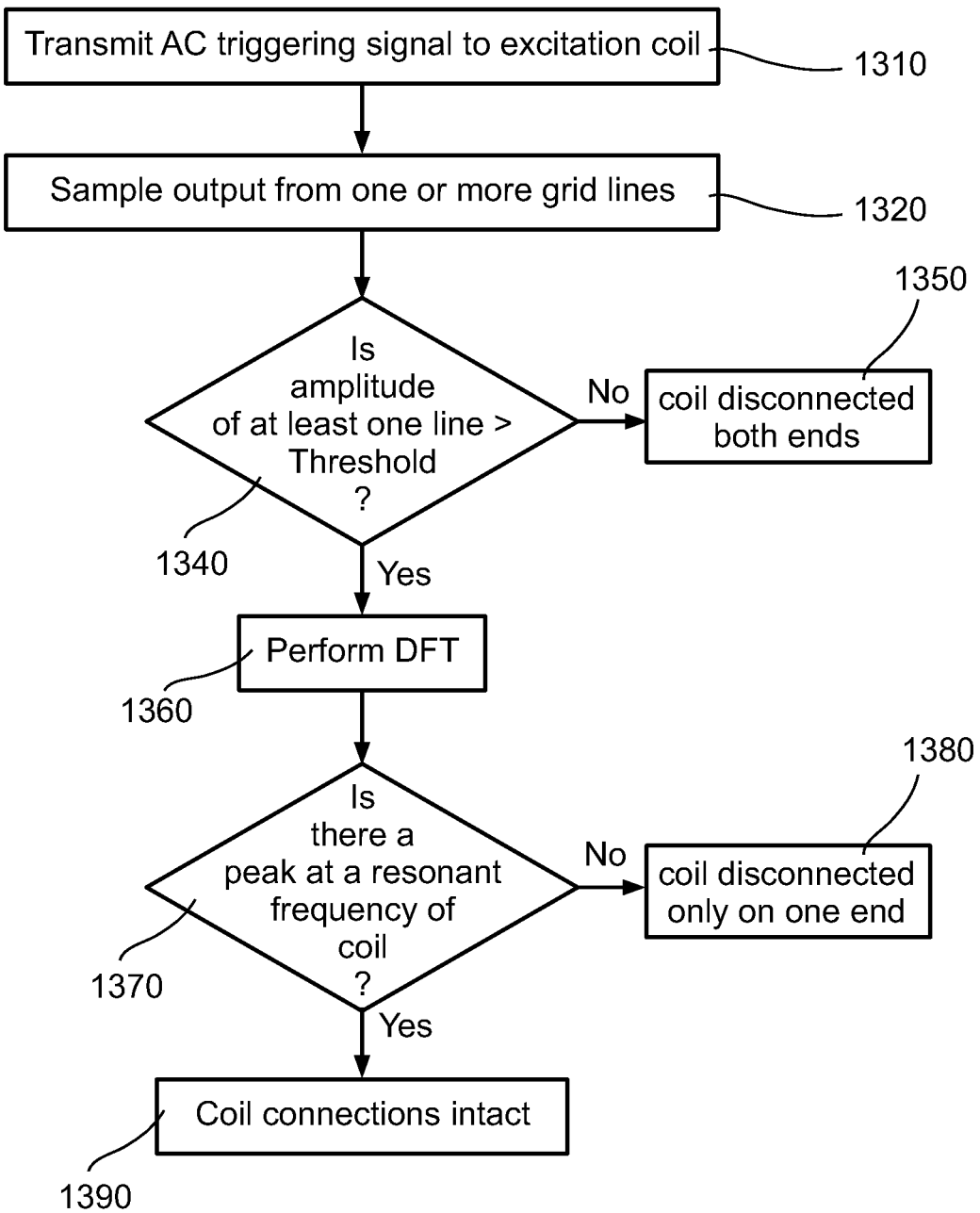
FIG. 13 shows a simplified flow chart of an exemplary method for detecting operational properties of an excitation coil surrounding a sensor grid in accordance with some embodiments of the present invention.

Reference is now made to FIG. 13 shows a simplified flow chart of an exemplary method for detecting operational properties of an excitation coil surrounding a sensor grid in accordance with some embodiments of the present invention. According to embodiments of the present invention, during self-diagnosis of excitation coil 26, an AC triggering pulse is transmitted to the excitation coil (1310). Output from one or more gridlines is sampled (block 1320). Amplitude of output sampled from the gridlines is compared to a threshold (block 1340). In some exemplary embodiments, output from each gridline is compared to the threshold. In some exemplary embodiments, an average output from all the gridline or from all the gridlines on a single axis is compared to the threshold. Alternatively and/or additionally other thresholding methods can be used as described herein. In some exemplary embodiments, when the output is determined to be below the threshold, the excitation coil is determined to be fully disconnected at both ends (block 1350). In some exemplary embodiments, when the output is determined to be above the threshold, DFT is performed to determine frequency properties of the sampled output (block 1360). According to embodiments of the present invention, potential peaks at frequencies at and/or near one or more resonant frequencies of the excitation coil are detected and analyzed (block 1370). If a peak is found, the excitation coil is determined to be fully connected (block 1390), otherwise the excitation coil is determined to be disconnected on one end (block 1380). In some exemplary embodiments, a peak is determined when the energy of a signal at a specified frequency and/or frequency band is above a threshold. In some exemplary embodiments, normalization of the signal in the frequency domain is performed prior to thresholding. Optionally other methods for thresholding, as described herein are used to determine peaks in the frequency domain. In some exemplary embodiments, when output from only one gridline is determined to be above threshold, the excitation coil is determined to be connected.

In other exemplary embodiments, diagnosis of the excitation coil includes transmitting an excitation signal on excitation coil 26 and in response detecting a current in a 'test coil' included in the circuitry of the digitizer. When a current above a defined amplitude threshold is detected on the test coil, the excitation coil is determined to be connected.

According to some embodiments of the present invention, the self-diagnostics routine includes additional tests, such detecting connection between ASICs 16 and digital unit 20, detecting connection between digital unit 20 and host computer 22. In some exemplary embodiments, the self-diagnostics includes detecting imbalance between the gridlines and/or noise level on the gridlines.

According to some embodiments of the present invention, detecting connection between ASICs 16 and digital unit 20 includes first resetting data input to digital unit 20, then initiating sampling of output from the gridlines. If one or more ASICs 16 are disconnected to the digital ASIC, no data is will be written to the input of the digital unit 20 corresponding to disconnected ASICs 16. In some exemplary embodiments, the connection between ASICs 16 and digital unit 20 is determined to be intact, when input to digital 20 from each ASIC 16 is non-zero in response to the resetting and the sampling.

According to some embodiments of the present invention, the interface between the digital ASIC 20 and the host computer is a Universal Serial Bus (USB) interface. In an exemplary embodiment, connection between digital unit 20 and host computer 22 is diagnosed by testing the USB communication. In some exemplary embodiments, the USB communication test includes the following steps: the host asks the firmware on digital unit 20 to send data of a pre-defined length P1. In respond, the firmware sends random data at the pre-defined length with checksum. The host receives the data and verifies the checksum. Optionally, the time it took the message to arrive is recorded. In some exemplary embodiments, the host sends the firmware random data of pre-defined length P2, and requests the firmware to echo the data. The host waits for the firmware's reply and tests whether it matches the sent data. Optionally, the echo process is repeated several times According to some embodiments of the present invention, self-diagnosis includes detecting imbalance between gridlines of the sensor's conductive lines. In response to detected imbalance, a message is conveyed to the host and/or compensation is performed. Exemplary methods for compensating for imbalance is described in incorporated U.S. Patent Application Publication No. 20070268272 entitled "Variable Capacitor Array".

In some exemplary embodiments, self-diagnosis of imbalance is performed on digitizers whose output is sampled through differential amplifiers. In some exemplary embodiments, a method for self-diagnosis of imbalance includes transmitting an AC signal on gridlines along a first axis while sampling output obtained from capacitive coupling between the gridlines along a $2^{nd}$ axis. The sampled output signal is compared with a threshold using methods described herein above. When, the output signal is below said threshold, the pair of conductive gridlines is diagnosed as balanced pair. If the output signal is above said threshold, the pair of conductive gridlines is diagnosed as imbalanced pair. In an exemplary embodiment, the test is performed on all pairs of conductive gridlines and on both axes.

In an exemplary embodiment of the present invention, self diagnosis includes detecting a noise level on the gridlines. According to some embodiments of the present invention, the noise on the sensor's conductive gridlines test includes: sampling the sensor's conductive gridlines. Alternatively, when the pairs of conductive gridlines are input to differential amplifiers, the differential amplifier's output is sampled. The output signals are further examined with a predefined threshold, wherein said pre-defined threshold is a noise level allowed by the system.

Figure 14:
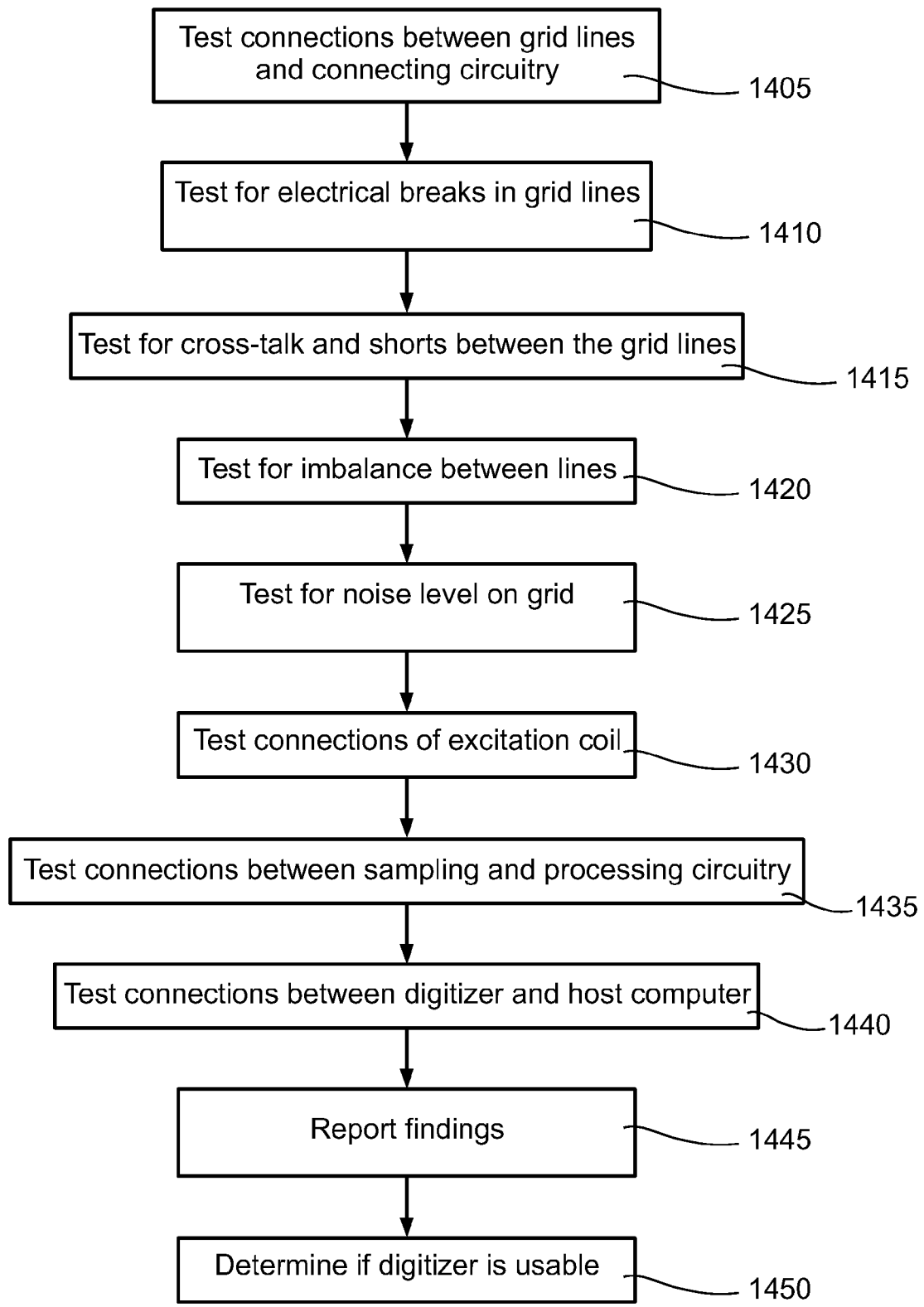
FIG. 14 shows a simplified flow chart of an exemplary method for self-diagnosis in accordance with some embodiments of the present invention.

Reference is now made to FIG. 14 showing a simplified flow chart of an exemplary method for self diagnosis in accordance with some embodiments of the present invention. In some exemplary embodiments, self diagnosis includes detecting connections between gridlines and I/O terminals and/or ASICs 16 (block 1405). In some exemplary embodiments, self diagnosis includes detecting electrical breaks along the gridlines of the digitizer (block 1410). In some exemplary embodiments, self diagnosis includes detecting cross-talk and shorts between the gridlines (block 1415). In some exemplary embodiments, self diagnosis includes detecting imbalance between the gridlines and/or pairs of gridlines (block 1420). In some exemplary embodiments, self diagnosis includes detecting noise level in the gridlines (block 1425). In some exemplary embodiments, self diagnosis includes detecting connection between excitation coil and connected circuitry, e.g. digital unit 20 (block 1430). In some exemplary embodiments, self diagnosis includes detecting connection between sampling circuitry and processing circuitry, e.g. between ASICs 16 and digital unit 20 (block 1435). In some exemplary embodiments, self diagnosis includes detecting communication between digitizer and host computer (block 1440). According to some embodiments of the present invention, the digitizer reports findings of self-diagnosis (block 1445). According to some embodiments of the present invention, based on analysis of output of self-diagnosis, the digitizer determines if the digitizer and/or sensor are functional (block 1450).

Figure 15A:
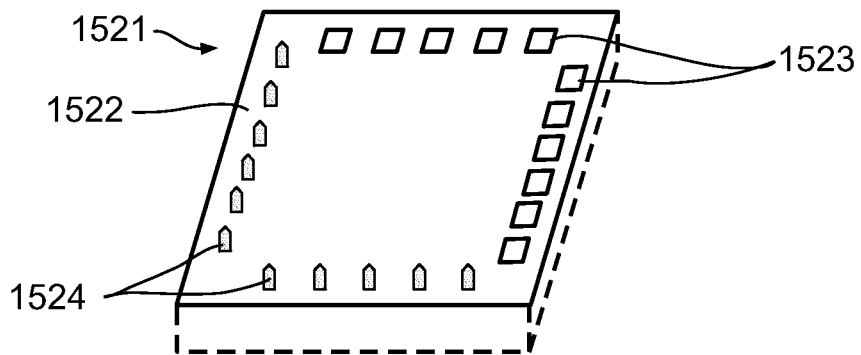
FIGS. 15A-15C illustrate exemplary simplified testing platforms in accordance with some embodiments of the present invention.
Figure 15B:
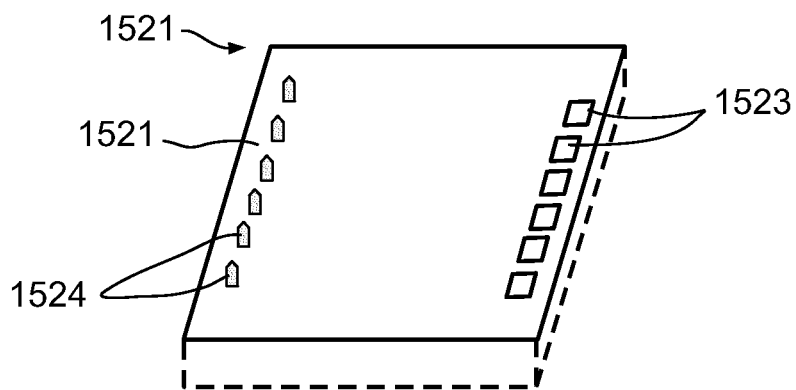
Figure 15C:
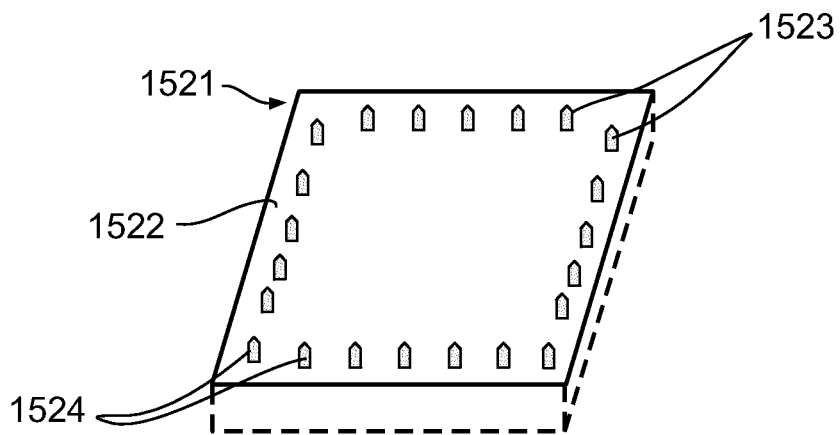

According to some embodiments of the present invention, there is provided a tester for diagnosing operational properties of a sensor grid while digitizer is assembled, partially assembled and/or not assembled. Reference is now made to FIG. 15A-15C illustrating exemplary simplified testing platforms in accordance with some embodiments of the present invention. In some exemplary embodiments, a testing platform 1521 includes a plurality of probes 1524 arranged in an array along one, two or four edges of the testing platforms surface 1522. In some exemplary embodiments, probes 1524 are manufactured from stainless steal or nickel and the tip of the probe is plated with gold. According to embodiments of the present invention, the probes are connected to a signal generator, e.g. an AC signal source. In some exemplary embodiments, the length of the probe along in its longitudinal axis is approximately 30 mm. In some exemplary embodiments, the testing platform 1521 includes one or two arrays of conductive pads 1523, e.g. I/O terminals, typically facing one or two of the arrays of probes. In some exemplary embodiments, the I/O terminals or conductive pads are made from conductive material such as carbon, graphite or silver.

According to some embodiments of the present invention, the probes and conductive pads are arranged in an array corresponding to the dimensions of gridlines of the digitizer. In some exemplary embodiments, the number of probes and/or conductive pads on each edge of the testing platform corresponds to the number of gridlines of an axis of the grid and the distance between the probes or conductive pads of an array correspond to the distance between the gridlines along an axis of the grid. In some exemplary embodiments, testing platform includes a configuration where for each gridline, e.g. each gridline along an axis of the grid, a probe is positioned on one end of the gridline and is used to invoke a signal through that gridline while a conductive pad is positioned on a second end of the gridline as is used to detect a signal propagating on the gridline (FIG. 15B). In some exemplary embodiments, the configuration shown in FIG. 15C is used when the I/O terminals of the digitizer is not accessible or do not exist.

Figure 16:
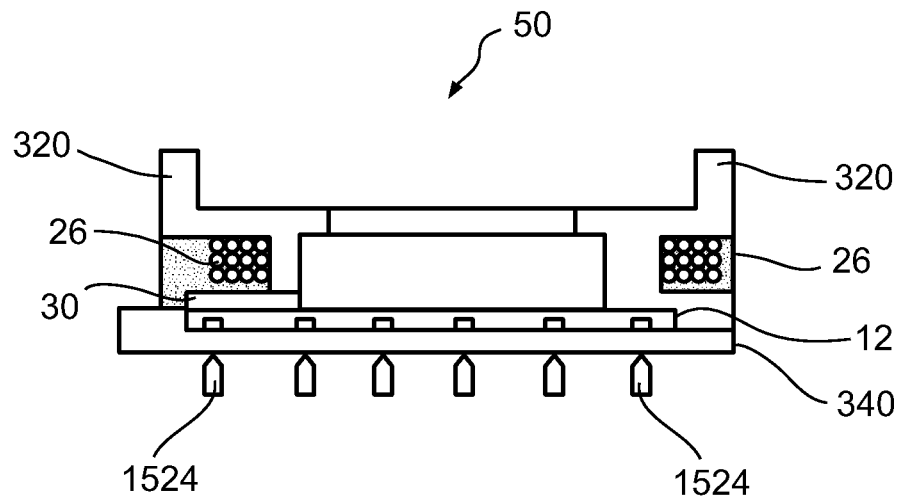
FIG. 16 illustrates a cross section view of an exemplary simplified digitizer positioned over an exemplary simplified testing platform in accordance with some embodiments of the present invention.

Reference is now made to FIG. 16 illustrating a cross section view of an exemplary simplified digitizer 50 positioned over an exemplary simplified testing platform in accordance with some embodiments of the present invention.

According to embodiments of the present invention, during operation of the testing platform 1521 a digitizer 50 and/or digitizer sensor 12 is positioned over the testing platform 1521 such that the interactive surface of the digitizer 340 is facing the testing platform. According to some embodiments of the present invention, the testing platform includes markers and/or alignment device to facilitate positioning the digitizer over the testing platform in a manner such that gridlines of the digitizer is positioned directly over probes and/or conductive pads of the testing platform. In some exemplary embodiments, the probes include a spring mechanism and the platform includes a clasp mechanism for holding down the digitizer or sensor 12. In some exemplary embodiments, when the digitizer or sensor 12 is positioned over the testing platform and clasped in position, the probes are pushed down under pressure and held tightly against the digitizer or sensor 12.

Figure 17:
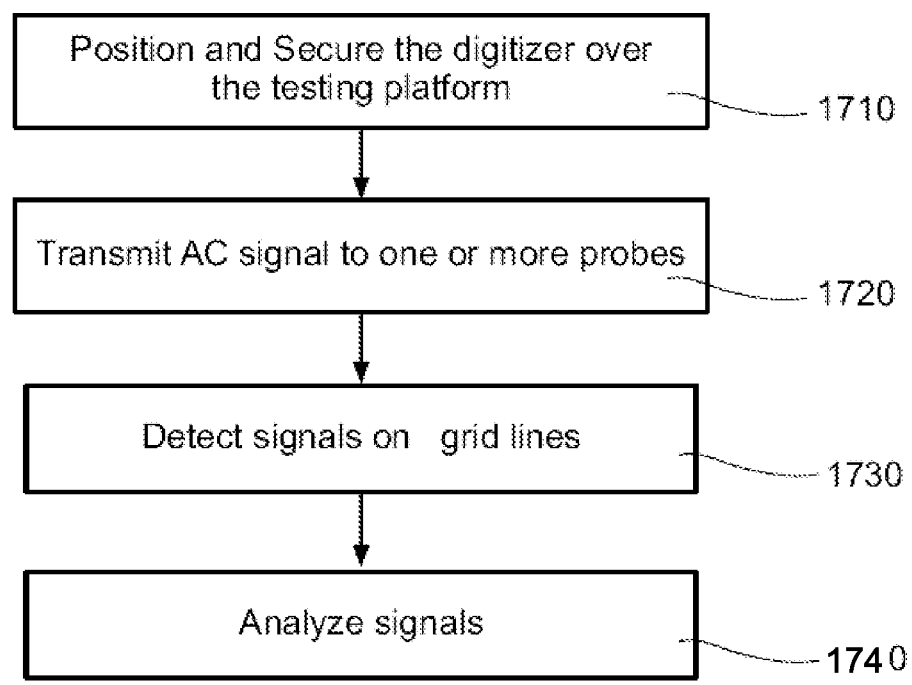
FIG. 17 shows a simplified flow chart of an exemplary method for diagnosing with a testing platform, operational properties of a digitizer sensor in accordance with some embodiments of the present invention.

Reference is now made to FIG. 17 showing a simplified flow chart of an exemplary method for diagnosing operational properties of a digitizer sensor in accordance with some embodiments of the present invention. According to some embodiments of the present invention, the digitizer sensor is positioned and secured over the testing platform (block 1710). An AC signal is transmitted through one or more probes (block 1720). Signals invoked on gridlines of the sensor due to capacitive coupling between the probes and the sensor gridlines are detected (block 1730) and analyzed (block 1740). In some exemplary embodiments, detection is performed by the digitizer, e.g. ASICs 16 sampling data from I/O terminals of the digitizer. Optionally, detection is performed by a testing probe connected to sensor gridlines on opposite end from an input to the gridlines. In some exemplary embodiments, detection is achieved by sampling signals on conductive pads and/or probes picking up signals from the gridlines due to capacitive coupling. In some exemplary embodiments, a signal is invoked on a gridline on one end of the gridline and detection of the propagated signal is determined by capacitive coupling of the gridline and a probe or conductive pad positioned on the opposite end of the gridline. In some exemplary embodiments, a signal is invoked on a gridline on one end of the gridline and detection of the propagated signal is determined from output on crossing gridlines as described herein. Output from crossing gridlines can be detected by sampling the crossing gridlines and/or be picking up capacitively coupled signals on probes and/or conductive pads positioned under the gridlines. Detected signals are analyzed using any of the methods described herein above.

Figure 18:
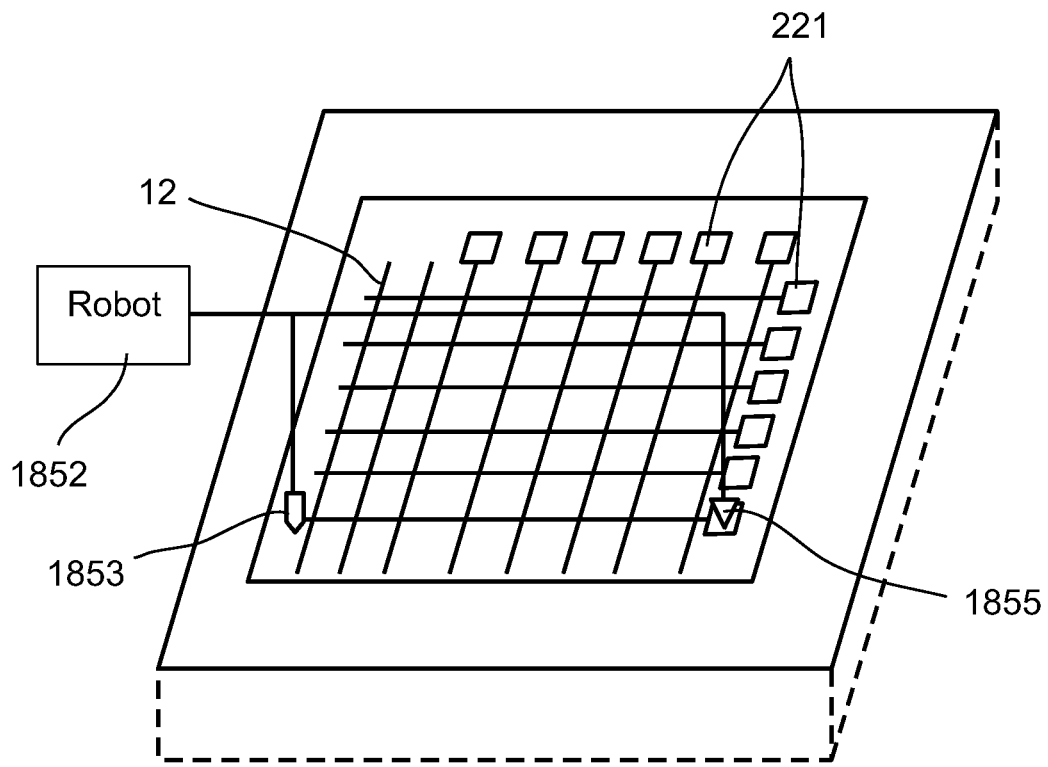
FIG. 18 illustrates an exemplary simplified robotic testing device for diagnosing a digitizer sensor in accordance with some embodiments of the present invention.

Reference is now made to FIG. 18 illustrating an exemplary simplified robotic testing device for diagnosing a digitizer sensor in accordance with some embodiments of the present invention. According to some embodiments of the present invention, testing device includes a robot 1852 connected to two probes. In some exemplary embodiments, one probe 1853 is connected to an AC signal source and is used to invoke signals on one or more gridlines through capacitive coupling between the probe and the gridlines. In some exemplary embodiments, the other probe 1855 is connected to a signal detector and is used to pick up signals from the gridlines by capacitive coupling between the probe and the gridlines. The robot functions to position the two probes over the digitizer sensor and control input and output through the probes. In some exemplary embodiments, the robot positions the probes at different positions on the digitizer sensor and is not limited to positioning the probes on the edges of the conductors. In some exemplary embodiments both probes are positioned over the interactive surface of the digitizer sensor as shown in FIG. 18. Optionally, at least one of the probes is positioned underneath the digitizer sensor, on the surface opposite the interactive surface of the digitizer.

Although in FIG. 18, the robotic is shown with one arm connected to two probes, in some exemplary embodiments, each arm is connected to a separate arm and can be individually controlled. In some exemplary embodiments, this configuration enables the detection of short circuit as described herein, since the detecting probe can be positioned on neighboring gridlines In some exemplary embodiments, the robot serially scans the entire sensor grid, by moving the probes along the sensor's conductors. Optionally, the tester comprises more than one probe for detecting signals invoked on the gridlines so that output from several gridlines can be the simultaneous detected. Optionally, the testing device comprises more than one probe 1853 for simultaneously invoking a signal on a plurality of gridlines. Optionally, the testing device includes a conductive roller and the conductive roller is used to invoke signals on one or more gridlines while the roller rolls along an axis of the sensor.

According to some embodiments of the present invention, diagnostic tests performed on the digitizer and/or digitizer sensor are tailored for different modes of operation, for different users, and/or for different software applications running in conjunction with the digitizer. In some exemplary embodiments, properties of the input signal may be adjusted for different diagnostic tests. In some exemplary embodiments, amplitude of the input AC signal used for diagnostics may be adjusted for specific users. In some exemplary embodiments, the frequency of the input signal is adjusted to accommodate operation with a specific kind of user interaction, e.g. stylus or finger touch. In some exemplary embodiments, the diagnostic test performed on the digitizer is adjusted based on the accuracy required for a specific software application running in conjunction with the digitizer.

Although embodiments of the present invention have been described in reference to exemplary grid based digitizer 50 as is schematically shown in FIGS. 1-3, it is noted that embodiments of the present invention described herein can be applied to touch screens and/or other capacitive grid sensors.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method for testing a capacitive based digitizer to determine a defect in electrical connectivity of the digitizer, wherein the digitizer includes a sensor grid formed from a first set of parallel conductive elements and a second set of parallel conductive elements patterned on one or more layers of a substrate, wherein the second set is patterned orthogonally from the first set to form the sensor grid and wherein all the conductive elements from both the first and the second set are patterned on the substrate and electrically insulated from each other, the method comprising:
- providing an input signal on one or more first conductive elements of the sensor grid;
- detecting output signals in a plurality of second conductive elements of the sensor grid responsive to the input signal in the at least one first conductive element, the plurality of second conductive elements being other than the one or more first conductive elements;
- determining a defect in electrical connectivity in the sensor grid based on the output signals, wherein at least the providing, detecting and determining is performed autonomously by the digitizer; and
- identifying a conductive element of the sensor grid with the defect in electrical connectivity based on the output signals.

2. The method according to claim 1, wherein the method for testing a digitizer to determine a defect in electrical connectivity of the digitizer is performed in the absence of user interaction with the digitizer.

3. The method according to claim 1 wherein the method is performed by firmware of the digitizer.

4. The method according to claim 1, wherein the output signals are detected from conductive elements positioned orthogonally to the one or more first conductive elements on which the input signal is provided.

5. The method according to claim 1, wherein the output signals are detected from conductive elements parallel to the one or more first conductive elements on which the input signal is provided.

6. The method according to claim 1, wherein the output signals are effected by capacitive coupling between the one or more first conductive elements and the plurality of second conductive elements of the sensor grid.

7. The method according to claim 1 wherein the output signals are effected by capacitive coupling at grid junctions formed between the first and second set of parallel conductive elements.

8. The method according to claim 1, wherein pairs of parallel conductive elements are input to differential amplifiers and wherein output from the differential amplifiers is sampled to produce the output signals from the sensor grid.

9. The method according to claim 8 comprising grounding a first input of a differential amplifier to detect a signal propagating on a second input of the differential amplifier.

10. The method according to claim 1, comprising:
- providing an input signal on the first set of parallel conductive elements; and
- detecting output signals from the second set of parallel conductive elements.

11. The method according to claim 1 wherein the input signal is an AC signal.

12. The method according to claim 11, wherein the input signal is provided at a frequency used during user interaction with the digitizer for finger detection.

13. The method according to claim 1, wherein detecting includes comparing the amplitude of the output signals from the sensor grid to a pre-defined threshold.

14. The method according to claim 1, wherein detecting includes comparing the energy of the output signals from the sensor grid in a pre-defined frequency band to a pre-defined threshold.

15. The method according to claim 1, wherein detecting includes comparing the output signals of the sensor grid to properties of the input signal.

16. The method according to claim 1, comprising comparing amplitude of each of the output signals to an average amplitude of the output signals.

17. The method according to claim 16, comprising comparing the amplitude of each of the output signals to a standard deviation of the average amplitude of the output signals.

18. The method according to claim 1, comprising determining connectivity between conductive elements of the sensor grid and circuitry of the digitizer.

19. The method according to claim 1, comprising detecting an electrical break in conductive elements of the sensor grid.

20. The method according to claim 19 comprising:
- providing an AC input signal on a first end of a first conductive element of the sensor grid, the first conductive element including a first end and a second end;
- sampling an output signal from at least one second conductive element crossing the first conductive element closest to the second end;
- comparing the output signal to a threshold; and
- determining that the first conductive element includes the electrical break responsive to the output signal being below the threshold.

21. The method of claim 19, comprising determining a location of the electrical break along the defected conductive element.

22. The method according to claim 1, comprising determining cross-talk between gridlines of the sensor grid.

23. The method according to claim 22 comprising:
- providing an AC input signal on the one first conductive element of the sensor grid;
- sampling an output signal from a neighboring conductive element that is parallel to the one first conductive element;
- comparing the output signal to a threshold; and
- determining that there is cross talk between the one first conductive element on which an input signal is provided and the neighboring conductive element responsive to the output signals sampled being above the threshold.

24. The method according to claim 1, comprising determining shorts between gridlines of the sensor grid.

25. The method according to claim 24 comprising:
- providing an AC input signal on one first conductive element of the sensor grid;
- sampling output signals from neighboring conductive elements that are parallel to the one first conductive element;
- comparing the output signals to a threshold; and
- determining that there is a short between the one first conductive element through which an input signal is transmitted and the neighboring conductive element responsive to an output signal from the neighboring conductive element being above the threshold.

26. The method according to claim 1, comprising determining an imbalance between gridlines of the sensor grid.

27. The method according claim 26 comprising:
- providing an AC input signal on one first conductive element of the sensor grid;
- sampling an output signal from at least one differential amplifier having input from two parallel conductive elements crossing the one first conductive element;

comparing the output signal to a threshold; and determining that there is an imbalance between the two parallel conductive element serving as input to the differential amplifier responsive to the output signal being above the threshold.

28. The method according to claim 1, comprising reporting the determined defect to a host computer associated with the digitizer.

29. The method according claim 28 comprising reporting the determined defect to a user interacting with the host computer.

30. The method according to claim 28 comprising determining if the sensor grid is operable and reporting operability of the sensor grid.

31. The method according to claim 1 comprising compensating for at least one malfunctioning property of the digitizer.

32. The method of claim 1, wherein the conductive elements in each of the first and second set of parallel conductive elements are gridlines.

33. The method of claim 1, wherein the defect in electrical connectivity detected includes a break along the conductive element of the sensor grid and at least one of a short between two conductive elements of the sensor grid and cross talk between conductive elements of the sensor grid.

34. The method of claim 1, wherein the conductive element of the sensor grid that is identified with the defect in electrical connectivity is one of the one or more first conductive elements or one of the plurality of second conductive elements.

\* \* \* \* \*